(12) United States Patent
Yamaguchi

(10) Patent No.: US 9,922,588 B2
(45) Date of Patent: Mar. 20, 2018

(54) IMAGE DISPLAY DEVICE

(71) Applicant: Sharp Kabushiki Kaisha, Sakai-shi, Osaka (JP)

(72) Inventor: Noriaki Yamaguchi, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 24 days.

(21) Appl. No.: 15/110,963

(22) PCT Filed: Dec. 3, 2014

(86) PCT No.: PCT/JP2014/082007
§ 371 (c)(1),
(2) Date: Jul. 12, 2016

(87) PCT Pub. No.: WO2015/114943
PCT Pub. Date: Aug. 6, 2015

(65) Prior Publication Data
US 2016/0343285 A1    Nov. 24, 2016

(30) Foreign Application Priority Data
Jan. 29, 2014    (JP) .................................. 2014-014145

(51) Int. Cl.
*G09G 3/20*   (2006.01)
*G09G 3/36*   (2006.01)
(Continued)

(52) U.S. Cl.
CPC .............. *G09G 3/2003* (2013.01); *G02B 6/00* (2013.01); *G02B 6/0056* (2013.01);
(Continued)

(58) Field of Classification Search
CPC ...... G02B 6/00; G02B 6/0056; G02B 6/0068; G02F 1/133528; G02F 1/133536;
(Continued)

(56) References Cited

U.S. PATENT DOCUMENTS

2002/0063670 A1    5/2002  Yoshinaga et al.
2010/0177025 A1*   7/2010  Nagata ................. G02B 6/0028
                                                345/76
(Continued)

FOREIGN PATENT DOCUMENTS

EP    2 966 499 A1    1/2016
JP    2002-229531 A   8/2002
(Continued)

*Primary Examiner* — Dmitriy Bolotin
(74) *Attorney, Agent, or Firm* — Keating & Bennett, LLP

(57) ABSTRACT

A liquid crystal display device (100) according to the present invention comprises: a transparent-display-area extraction circuit (15) for extracting an area to be used as a transparent display area from an input image signal (Sin); a subfield generation circuit (21) which divides the input image signal (Sin) into a plurality of subfields to generate a subfield image signal (Ssf) and reads, from a resister (22), transparency setting data (Dts) for forcibly changing the transparent display area to a state of transparent display in all the subfields; and a display panel drive unit (23,30) which displays an image on a crystal liquid panel (60) for each subfield on the basis of the subfield image signal (Ssf) and changes the transparent display area into a state of transparent display on the liquid crystal panel (60) on the basis of the transparency setting data (Dts).

12 Claims, 17 Drawing Sheets

(51) Int. Cl.
  *G02F 1/1335* (2006.01)
  *G02B 6/00* (2006.01)
  *G09G 3/34* (2006.01)
  *F21V 8/00* (2006.01)

(52) U.S. Cl.
  CPC ..... *G02B 6/0068* (2013.01); *G02F 1/133528* (2013.01); *G02F 1/133536* (2013.01); *G02F 1/133606* (2013.01); *G02F 1/133621* (2013.01); *G09G 3/2022* (2013.01); *G09G 3/3413* (2013.01); *G09G 3/36* (2013.01); *G02F 2001/133622* (2013.01); *G09G 2300/023* (2013.01); *G09G 2310/0235* (2013.01); *G09G 2320/0666* (2013.01)

(58) Field of Classification Search
  CPC ......... G02F 1/133606; G02F 1/133621; G02F 2001/133622; G09G 2300/023; G09G 2310/0235; G09G 2320/0666; G09G 3/2003; G09G 3/2022; G09G 3/3413; G09G 3/36
  See application file for complete search history.

(56) References Cited

U.S. PATENT DOCUMENTS

| | | | |
|---|---|---|---|
| 2012/0163021 A1* | 6/2012 | Bohn | G02F 1/133615 362/608 |
| 2013/0107160 A1* | 5/2013 | Kim | G09F 9/35 349/58 |
| 2015/0103107 A1* | 4/2015 | Kobayashi | G09G 3/3413 345/691 |
| 2015/0279256 A1 | 10/2015 | Kobayashi | |
| 2015/0302805 A1 | 10/2015 | Miyata | |
| 2015/0325163 A1 | 11/2015 | Kobayashi | |
| 2016/0343285 A1* | 11/2016 | Yamaguchi | G02F 1/133536 |
| 2017/0150085 A1* | 5/2017 | Nishiguchi | H04N 5/44504 |

FOREIGN PATENT DOCUMENTS

| | | |
|---|---|---|
| WO | 2014/017344 A1 | 1/2014 |
| WO | 2014/054521 A1 | 4/2014 |
| WO | 2014/097976 A1 | 6/2014 |
| WO | 2014/136586 A1 | 9/2014 |

* cited by examiner

Fig. 11
(A)
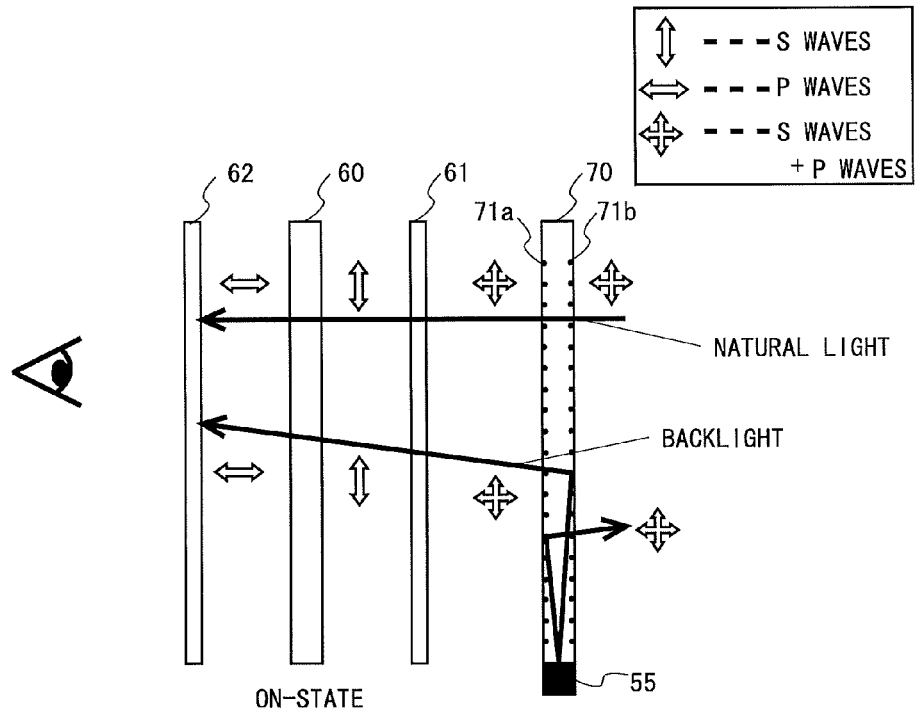
ON-STATE
(B)
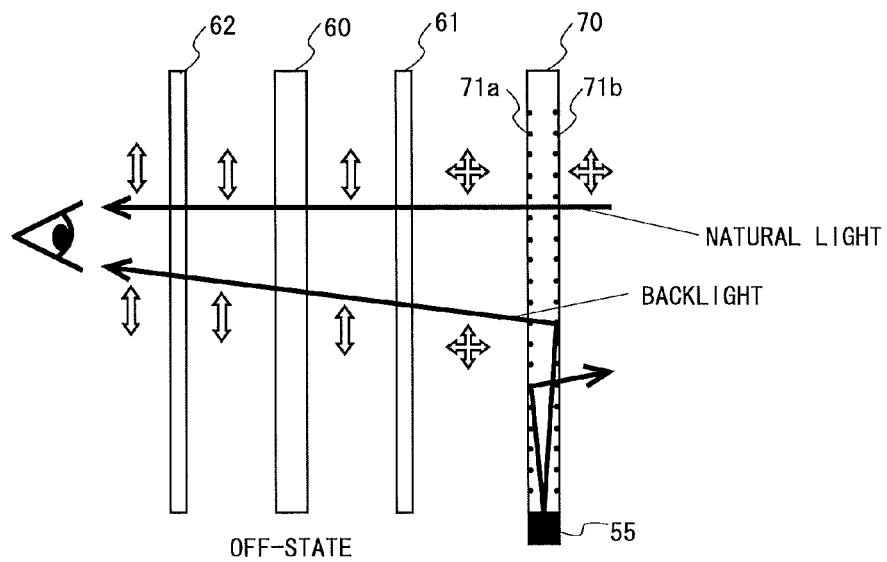
OFF-STATE

IMAGE DISPLAY DEVICE

TECHNICAL FIELD

The present invention relates to an image display device, and particularly relates to an image display device having a transparent display function of making a background viewable through a liquid crystal panel.

BACKGROUND ART

In recent years, as one of drive systems for a liquid crystal display device that displays a color image, the development of a field-sequential system has been actively advanced. A typical field-sequential system is a system in which a one-screen display period (one frame period) is divided into three subfields, and each of LEDs (Light Emitting Diodes) of red (R), green (G), and blue (B) to be a light source of backlight is sequentially switched, and in synchronization therewith, an image signal of a color corresponding to the color of light of each LED is provided to a liquid crystal panel to control its transmission state, thereby performing additive color mixing on retinas of observer's eyes. According to the field-sequential system, color display can be performed without forming a plurality of sub-pixels for one pixel, thereby enabling high resolution. Further, direct use of the light from the LED eliminates the need for forming a color filter with high absorption at each pixel, thereby improving the light usage efficiency of each LED.

Meanwhile, in the field-sequential system, the lighting time for each of the LEDs of R, G, B is not the same, which causes a problem of occurrence of "color breakup" at the time of display of a moving image on a liquid crystal panel. As one of methods for solving this problem, Japanese Patent Application Laid-Open No. 2002-229531 describes a method in which one frame period is divided into not only three subfields consisting of the respective single colors of R, G, B, but a total of four subfields obtained by adding one subfield made up of a mixed color of these three colors, to make a ratio of the single color subfields small. In this case, if another color is mixed into the added subfield, the color balance of the image is lost, which makes an accurate color unreproducible, and hence the added subfield is preferably made up of an achromatic color such as black, white, or gray. Accordingly, in the following description, the subfields made up of the respective single colors of R, G, B are referred to as "R field", "G field", and "B field", respectively, and the subfield made up of the achromatic color is referred to as "W field".

FIG. 16 is a diagram showing light emission states of the LEDs, and four subfields constituting one frame, in the case of displaying an image by the field-sequential system provided with the four subfields in a conventional example. A high part of a waveform of each LED shown in FIG. 16 represents a "lighted state", and a low part thereof represents a "non-lighted state". In the W field, all of the red LED, the green LED, and the blue LED are in the lighted states throughout one subfield period. In the R field, only the red LED is in the lighted state throughout one subfield period. In the G field, only the green LED is in the lighted state throughout one subfield period. In the B field, only the blue LED is in the lighted state throughout one subfield period. In synchronization with the lighted state of each LED, image data of a color corresponding to the color of light of each LED is sequentially provided to the liquid crystal panel, to control a light transmission state in each of the W field, R field, G field, and B field.

FIG. 17 is a view showing an image that is viewed by the observer when the image is displayed by the field-sequential system provided with the four subfields, and FIG. 18 is a view showing an image of each subfield when the image shown in FIG. 17 is displayed by the field-sequential system. In the image shown in FIG. 17, characters of "No. 123" are displayed in blue, characters of "Please come in" are displayed in pink, characters of "This week's consultation" and consultation dates and times are displayed in green, and a consultation timetable is displayed in yellow.

When the image shown in FIG. 17 is to be displayed by the field-sequential system, as shown in FIG. 18, first, in the W field, based on brightness information obtained from an input image signal, a transmittance of the liquid crystal panel is controlled such that an area where no image of the characters, the consultation timetable, or the like is displayed in any of the subfields of R, G, B, described later, becomes a transparent display area where red light, green light, and blue light are transmitted, and an area where the images of the characters, the consultation timetable, and the like are displayed becomes a black display area where the above light cannot be transmitted, and each of the red, green and blue LEDs is simultaneously lighted. Accordingly, in the W field, the area where no image of the characters, the consultation timetable, or the like is displayed in each of the subfields of R, G, B becomes the transparent display area, and the area where the images of the characters, the consultation timetable, and the like are displayed becomes the black display area.

Next, based on color information obtained from the input image signal, the images are displayed in the order of the subfields of R, G, B. More specifically, in the R field, the characters of "Please come in" become transparent, and the red LED is lighted, thus displaying the characters in red. In the G field, the characters of "This week's consultation", the characters representing the consultation dates and times, and the consultation timetable become transparent, and the green LED is lighted, thus displaying these characters and the consultation timetable in green. In the B field, the characters of "No. 123", the characters of "Please come in", and the consultation timetable become transparent, and the blue LED is lighted, thus displaying these characters and the consultation timetable in blue. Further, in each subfield, when the characters and the consultation timetable become the transparent display area, an area therearound becomes the black display area so as to prevent transmission of any of the red light, green light, and blue light.

As a result, the observer sees the characters of "No. 123" in blue, the characters of "Please come in" in pink, the characters of "This week's consultation" and the characters representing the consultation dates and times in green, and the consultation timetable in yellow. Further, the area around the characters and the consultation timetable becomes transparent, and the background of the liquid crystal display device is viewed overlapping with the images of the characters and the like.

PRIOR ART DOCUMENT

Patent Document

[Patent Document 1] Japanese Patent Application Laid-Open No. 2002-229531

SUMMARY OF THE INVENTION

Problems to be Solved by the Invention

FIG. 19 is a diagram showing transmittances of the liquid crystal panel in the four subfields constituting one frame at the time of displaying an image on the liquid crystal display device by the field-sequential system shown in FIG. 18. In the case of using the liquid crystal display device as a transparent display through which a background is viewable, when the period with a high transmittance of the liquid crystal panel is made longer, the time during which the background is viewable becomes longer, which makes the background easier to view. However, as shown in FIG. 19, it is only in the W field that has a high transmittance of the liquid crystal panel, and in the R field, the transmittance is slightly higher in the first half period due to an influence of the transmittance of the W field, but in the latter half period, the transmittance becomes a transmittance at the time of black display. Further, in each of the subfields of G and B, the transmittance becomes the transmittance at the time of black display. Hence, the subfield in which the background of the liquid crystal display device is viewable is only the W field, and the background is not viewable in each of the subfields of R, G, B. When such a liquid crystal display device is used as the transparent display, the time during which the background is viewable is short, and hence the observer has the problem that the background of the liquid crystal display device cannot be clearly viewed.

Therefore, it is an object of the present invention to provide an image display device having a transparent display function of making a background easily viewable.

Means for Solving the Problems

A first aspect of the present invention is directed to an image display device that divides one frame period of a given input image signal into a plurality of subfields and displays a screen of a different color in each of the subfields, to display a color image, the image display device comprising:

a display panel configured to control a transmittance of incident light;

a transparent-display-area extraction portion configured to extract an area to be transparently displayed from the input image signal as a transparent display area;

a subfield generation portion configured to divide the input image signal into the plurality of subfields to generate subfield image signals, and obtain transparency setting data for forcibly transparently displaying the transparent display area in all of the subfields;

a display panel drive portion configured to display an image on the display panel in each of the subfields based on the subfield image signal, and transparently display the transparent display area on the display panel based on the transparency setting data;

a light source portion configured to emit light of a different color toward the display panel in each of the subfields; and a light source drive portion configured to drive the light source portion based on a control signal provided from the subfield generation portion.

According to a second aspect of the present invention, in the first aspect of the present invention, further comprising a register connected to the subfield generation portion and configured to store the transparency setting data, wherein, when the subfield generation portion is provided with transparent display data indicating the transparent display area extracted by the transparent-display-area extraction portion, the subfield generation portion reads the transparency setting data from the register and provides the transparent display data and the transparency setting data to the display panel drive portion.

According to a third aspect of the present invention, in the second aspect of the present invention, wherein the transparency setting data includes a gradation value that enables transparent display of the transparent display area, and data required for setting a display color of the transparent display area, and the display panel drive portion controls at least the gradation value and the display color of the transparent display area displayed on the screen based on the transparency setting data in each of the subfields.

According to a fourth aspect of the present invention, in the third aspect of the present invention, wherein the gradation value included in the transparency setting data is the same as a gradation value representing highest brightness of the display panel.

According to a fifth aspect of the present invention, in the third aspect of the present invention, wherein the gradation value included in the transparency setting data is a gradation value representing brightness lower than the highest brightness of the display panel.

According to a sixth aspect of the present invention, in the fourth aspect of the present invention, wherein the gradation values included in the transparency setting data include a plurality of gradation values each representing different brightness of the display panel.

According to a seventh aspect of the present invention, in the first aspect of the present invention, further comprising a casing configured to accommodate the display panel and the light source portion, wherein the display panel is attached to an opening formed in the casing, and the light source portion is attached to an inner surface of the casing, and configured to apply light from a rear-surface side of the display panel.

According to an eighth aspect of the present invention, in the first aspect of the present invention, wherein the display panel includes two absorption type polarizing plates respectively adhered to both surfaces of the display panel, the light source portion includes a light-guiding plate and a light source having a plurality of light emitting elements linearly arranged, the light source being attached to an end of the light-guiding plate such that light emitted from each of the plurality of light emitting elements is incident on the light-guiding plate, the light-guiding plate and the display panel are fixed, with a background in a viewable state, and the light source portion emits, toward the display panel, the light incident on the light-guiding plate from the light source.

According to a ninth aspect of the present invention, in the eighth aspect of the present invention, wherein both of the two absorption type polarizing plates absorb one of first polarization waves and second polarization waves having different polarization directions, and transmit the other of the first polarization waves and the second polarization waves.

According to a tenth aspect of the present invention, in the first aspect of the present invention, wherein the display panel includes an absorption type polarizing plate adhered to a front-surface-side surface of the image display device, the light source portion includes a light-guiding plate formed by having a reflection type polarizing plate adhered to a back-surface-side surface of the image display device, and a light source having a plurality of light emitting elements linearly arranged, the light source being attached to an end of the light-guiding plate such that light emitted from each of the plurality of light emitting elements is incident on the light-guiding plate, the light-guiding plate and the display panel are fixed, with a background in a viewable state, and the light source portion is configured to emit, toward the display panel, the light incident on the light-guiding plate from the light source.

According to an eleventh aspect of the present invention, in the tenth aspect of the present invention, wherein the absorption type polarizing plate is a polarizing plate configured to transmit one of the first polarization waves and the second polarization waves and absorb the other of the first polarization waves and the second polarization waves, and the reflection type polarizing plate is a polarizing plate configured to reflect the same polarization waves as the polarization waves that are absorbed into the absorption type polarizing plate, and transmit the same polarization waves as the polarization waves that transmitted through the absorption type polarizing plate.

According to a twelfth aspect of the present invention, in the eight or tenth aspect of the present invention, wherein a reflection structure is formed on at least one of surfaces of the light-guiding plate, the structure being configured to reflect light from the light source and emit the reflected light to outside.

Effects of the Invention

According to the first aspect of the present invention, a transparent display area is extracted based on an input image signal provided from the outside. Then, the input image signal is divided into a plurality of subfields, to obtain subfield image signals and also obtain transparency setting data for forcibly transparently displaying the transparent display area in every subfield. Using this transparency setting data, the display panel is driven so as to transparently display the transparent display area in every subfield. This makes the background viewable through the transparent display area in every subfield, thereby making the background clearly displayed and easily viewable.

According to the second aspect of the present invention, the transparency setting data is stored in the register connected to a subfield generating circuit. When the subfield generating circuit is provided with transparent display data indicating the transparent display area, the subfield generating circuit reads the transparency setting data from the register, and provides the transparent display data and the transparency setting data to the display panel drive portion. Hence the transparent display area specified by the transparent display data is displayed in a transparent state specified by the transparency setting data in each subfield, thereby making the background easily viewable through the transparent display area.

According to the third aspect of the present invention, in every subfield, the transparent display area is displayed using a gradation value and a display color which are specified by the transparency setting data. This makes the background easily viewable through the transparent display area.

According to the fourth aspect of the present invention, the gradation value included in the transparency setting data is the same as a gradation value representing highest brightness of the display panel. Accordingly, the transparent display area can be displayed with the highest brightness.

According to the fifth aspect of the present invention, the gradation value included in the transparency setting data is a gradation value representing brightness lower than the highest brightness of the display panel, thereby making a brightness difference between the transparent display area and the image small. Hence the image no longer appears dark, and the image is displayed in a more natural state.

According to the sixth aspect of the present invention, the gradation values included in the transparency setting data include a plurality of gradation values taking the display panel as the transparent display area. Hence the area having any gradation value of the plurality of gradation values becomes the transparent display area, thereby making the transparent display area of the display panel wide and the background easily viewable.

According to the seventh aspect of the present invention, the image display device can be used as a display case for displaying a display object inside a casing. In this case, the transparent display area in every subfield is forcibly transparently displayed, thereby making the display object easily clearly viewable. Further, a description of the display object can be displayed on the display panel by the subfield image signal, so that the observer can deepen the understanding of the display object.

According to the eighth aspect of the present invention, switching the light transmission state of the display panel enables the image and the background to be overlapped and displayed on the display panel, or nothing to be displayed thereon. In this case, the transparent display area in every subfield is forcibly transparently displayed, thereby making the background easily clearly viewable. Further, since the casing is unnecessary, an installation place of the image display device is not restricted by the casing. Accordingly, the image display device can be used for wider applications.

According to the ninth aspect of the present invention, both of the absorption type polarizing plates adhered to both surfaces of the display panel absorb one light of first polarization waves and second polarization waves having different polarization directions, and transmit the other light of the first polarization waves and the second polarization waves. Switching the light transmission state of the display panel by use of such absorption type polarizing plates can easily make the image and the background overlapped and displayed on the display panel, or can have nothing displayed thereon.

According to the tenth aspect of the present invention, switching the light transmission state of the display panel enables only the image to be displayed on the display panel, or only the background to be displayed thereon. Hence the observer cannot only clearly view the background, but also more easily view the image. Further, the transparent display area in every subfield is forcibly transparently displayed, thereby making the background easily clearly viewable when the background is displayed. Further, since the casing is unnecessary, an installation place of the image display device is not restricted by the casing. Accordingly, the image display device can be used for wider applications.

According to the eleventh aspect of the present invention, the absorption type polarizing plate adhered to the display panel transmits one of the first polarization waves and the second polarization waves and absorbs the other of the polarization waves, and the reflection type polarizing plate adhered to the light-guiding plate reflects the same polarization waves as the polarization waves that are transmitted through the absorption type polarizing plate, and transmits the same polarization waves as the polarization waves that are absorbed into the absorption type polarizing plate. The light transmission state of the display panel is switched by use of the absorption type polarizing plate and the reflection type polarizing plate described above. This makes it easy to display only the image on the display, or to display only the background thereon.

According to the twelfth aspect of the present invention, a reflection structure is formed on at least the top surface or the rear surface of the light-guiding plate. Hence, when light traveling in the light-guiding plate while being totally reflected is incident on the reflection structure, the light-guiding plate can reflect the incident light by the reflection structure, and emit the light in a desired direction.

BRIEF DESCRIPTION OF THE DRAWINGS

FIGS. 11(A) and 11(B) are sectional views each showing a transmission path of light that is transmitted through the liquid crystal panel and a light-guiding plate of the liquid crystal display device shown in FIG. 8, and more specifically, FIG. 11(A) is a sectional view showing the transmission path of the light when the liquid crystal panel of the liquid crystal display device is in an on-state, and FIG. 11(B) is a sectional view showing the transmission path of the light when the liquid crystal panel is in an off-state.

FIG. 13(A) is a sectional view showing the transmission path of the light when the liquid crystal panel of the liquid crystal display device is in the on-state, and FIG. 13(B) is a sectional view showing the transmission path of the light when the liquid crystal panel is in the off-state.

MODES FOR CARRYING OUT THE INVENTION

1. First Embodiment 1.1 Configuration of Liquid Crystal Display Device

Figure 1:
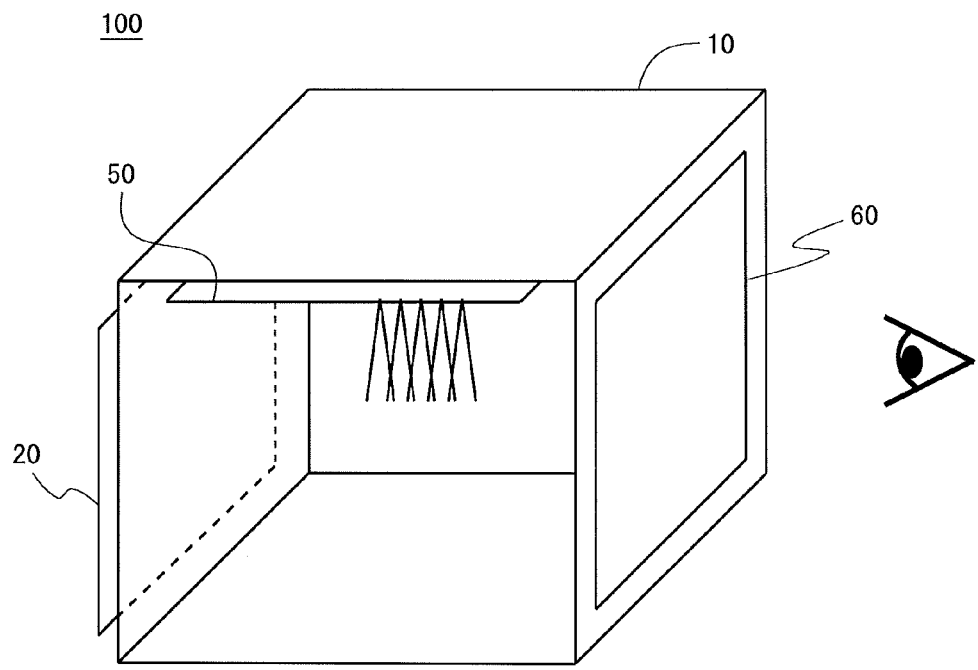
FIG. 1 is an external perspective view of a liquid crystal display device according to a first embodiment of the present invention.

FIG. 1 is an external perspective view of a liquid crystal display device 100 (also referred to as "image display device") according to a first embodiment of the present invention. As shown in FIG. 1, the liquid crystal display device 100 is a display device driven by the field-sequential system, and includes: a box-shaped casing 10; a liquid crystal panel 60 capable of high-speed drive that is suitable for the field-sequential system; a backlight light source portion 50 formed by arranging a plurality of LEDs capable of individually emitting light of each color of R, G, B; and a control circuit 20 for controlling the liquid crystal panel 60 and the backlight light source portion 50.

An rectangular opening is formed on the side surface of the casing 10, and the liquid crystal panel 60 is attached to the opening. Further, the backlight light source portion 50 is attached to the upper surface on the inner side of the casing 10, and the control circuit 20 is provided on the outer side of the side surface facing the side surface to which the liquid crystal panel 60 is attached. The control circuit 20 is connected to the liquid crystal panel 60 and the backlight light source portion 50 by wiring, and controls the liquid crystal panel 60 and the backlight light source portion 50. For this reason, an observer outside the casing 10 can view an image displayed on the liquid crystal panel 60 and view the inside of the casing 10 through the liquid crystal panel 60.

Figure 2:
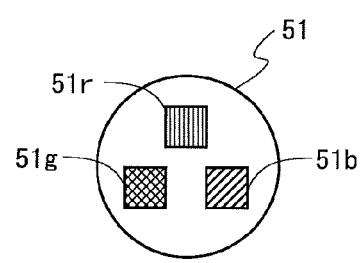
FIG. 2 is a view showing a configuration of an LED included in a backlight light source portion of the liquid crystal display device shown in FIG. 1.

FIG. 2 is a view showing a configuration of an LED 51 included in the backlight light source portion 50 of the liquid crystal display device 100 shown in FIG. 1. As shown in FIG. 2, the LED 51 as a light emitting element includes one red LED 51r that emits red light, one green LED 51g that emits green light, and one blue LED 51b that emits blue light. In addition, as the light emitting element constituting the backlight light source portion 50, a CCFL (Cathode Fluorescent Lamp) or the like may be used in place of the LED 51. Further, at least one of the red light emitting element, the green light emitting element, and the blue light emitting element may be replaced by a light emitting element that emits light of another primary color.

Figure 3:
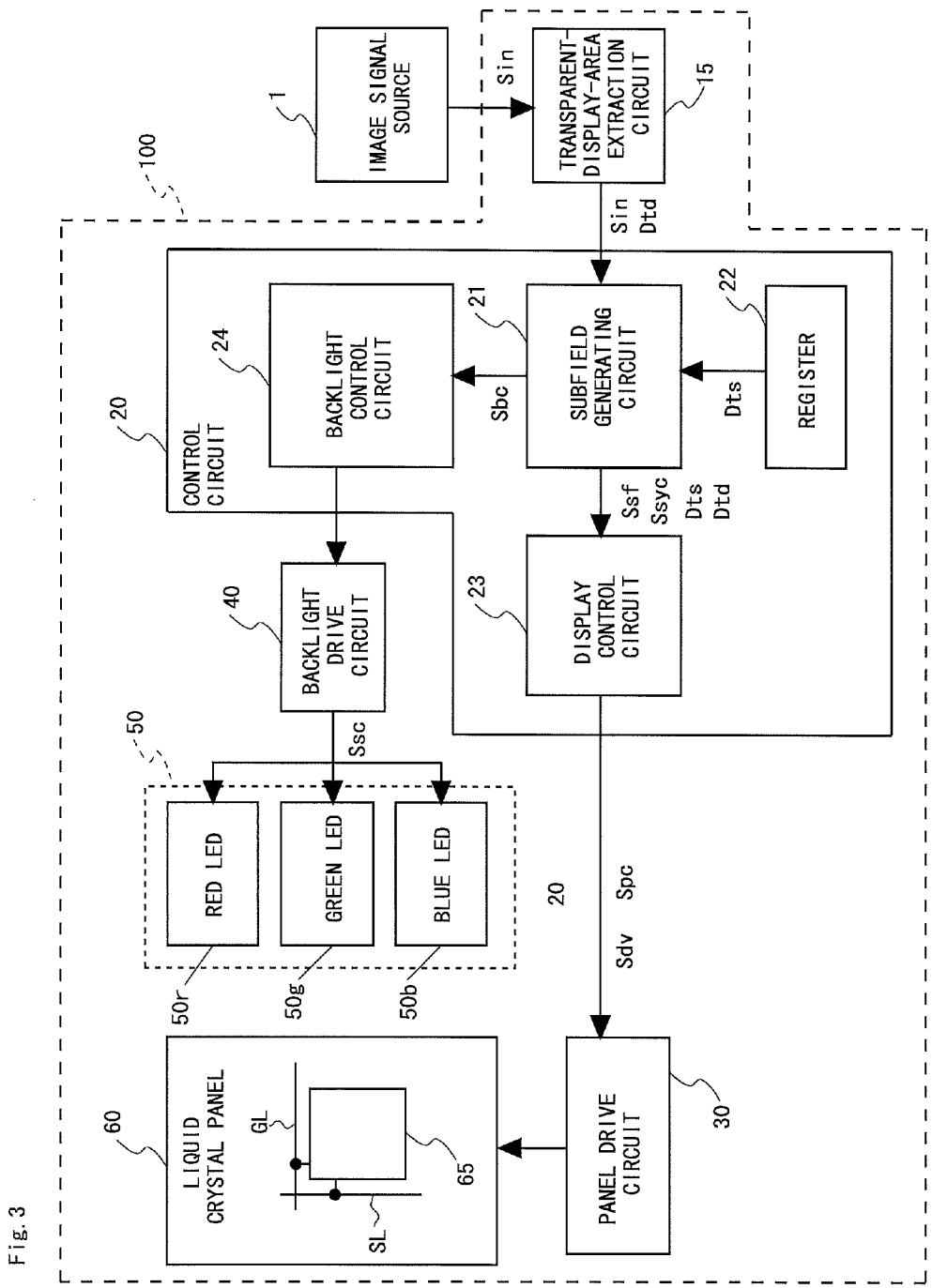
FIG. 3 is a block diagram showing a configuration of the liquid crystal display device shown in FIG. 1.

FIG. 3 is a block diagram showing a configuration of the liquid crystal display device 100 shown in FIG. 1. As shown in FIG. 3, the liquid crystal display device 100 includes the liquid crystal panel 60, a panel drive circuit 30, the backlight light source portion 50, a backlight drive circuit 40, the control circuit 20, and a transparent-display-area extraction circuit 15. The control circuit 20 includes a subfield generation circuit 21, a backlight control circuit 24, a display control circuit 23, and a register 22. The transparent-display-area extraction circuit 15 provides transparent display data Dtd, extracted from an input image signal Sin provided from an external image signal source 1, to the subfield generation circuit 21 of the control circuit 20 together with the input image signal Sin.

Based on the input image signal Sin received from the transparent-display-area extraction circuit 15, the subfield generation circuit 21 generates a subfield image signal Ssf for field-sequential drive, a synchronizing signal Ssyc for liquid crystal panel drive, and a backlight control signal Sbc for controlling lighting/non-lighting of the backlight light source portion 50 in each subfield. The subfield generation circuit 21 then provides the subfield image signal Ssf and the synchronizing signal to the display control circuit 23, and provides the backlight control signal Sbc to the backlight control circuit 24. More specifically, the subfield generation circuit 21 generates the subfield image signal Ssf obtained by dividing the input image signal Sin for one frame into each of the subfields of R, G, B, and generates the synchronizing signal Ssyc required for displaying an image based on the subfield image signal Ssf in each subfield. At this time, a frame rate of the input image signal Sin is also converted to a frame rate of the subfield image signal Ssf.

Further, in the register 22 connected to the subfield generation circuit 21, transparency setting data Dts, such as a gradation value, a display color, and the like of a transparent display area, is previously stored. Hence, when the subfield generation circuit 21 is provided with the transparent display data Dtd from the transparent-display-area extraction circuit 15, the subfield generation circuit 21 reads transparency setting data Dts from the register 22, and provides the transparency setting data Dts to the display control circuit 23 together with the transparent display data Dtd. Rewriting the transparency setting data Dts can change the gradation value, the display color, and the like of the transparent display area.

The display control circuit 23 generates a digital image signal Sdv of each subfield based on the subfield image signal Ssf formed by the division into each subfield, while generating a panel control signal Spc such as a timing signal, and provides the digital image signal Sdv and the panel control signal Spc to the panel drive circuit 30. The panel drive circuit 30 drives the liquid crystal panel 60 based on the received digital image signal Sdv and panel control signal Spc. The backlight control circuit 24 controls the backlight drive circuit 40 based on the backlight control signal Sbc provided from the subfield generation circuit 21, and the backlight drive circuit 40 provides the backlight light source portion 50 with a light source control signal Ssc for controlling lighted/non-lighted states of the red, green, and blue LEDs 51r, 51g, 51b which constitute the backlight light source portion 50. In the backlight light source portion 50, the lighted state and the non-lighted state of each of the LEDs 51r, 51g, 51b are switched as appropriate based on the light source control signal Ssc.

The liquid crystal panel 60 includes a plurality of data signal lines SL, a plurality of scanning signal lines GL, and a plurality of pixel formation portions 65 which are arranged in a matrix form corresponding to intersections of the plurality of data signal lines SL and the plurality of scanning signal lines GL. By the panel drive circuit 30 writing, into the pixel formation portions 65, the driving image signal generated from the digital image signal Sdv, an orientation direction of liquid crystal molecules contained in each pixel formation portion 65 is changed to control a transmittance of light that is transmitted through the pixel formation portion 65 (hereinafter may be referred to as "a transmittance of the liquid crystal panel"). In addition, only one pixel formation portion 65 is shown in the liquid crystal panel 60 of FIG. 3. Further, the liquid crystal panel 60 may be either a normally black type panel or a normally white type panel. Further, writing of a voltage in accordance with data for displaying black so as to prevent transmission of backlight, apart from the original image data, into the pixel formation portion 65 is referred to as "black writing".

In such a manner as above, the driving image signal corresponding to the color of the light of each LED is written into the data signal lines SL in synchronization with the lighted state of each of the LEDs 51r, 51g, 51b, and the scanning signal is sequentially written into the scanning signal lines GL. Hence the driving image signal of the color corresponding to the color of the light of each of the LEDs 51r, 51g, 51b is sequentially written into the pixel formation portion 65, and the lighted/non-lighted state of each of the LEDs 51r, 51g, 51b is switched as appropriate. An image is displayed on the liquid crystal panel 60 in this manner, and the observer can view the image based on the input image signal Sin. Note that the display control circuit 23 and the panel drive circuit 30 may be collectively referred to as a "display panel drive portion", the backlight light source portion 50 may be referred to as a "light source portion", and the backlight control circuit 24 and the backlight drive circuit 40 may be collectively referred to as a "light source drive portion".

1.2 Drive Method of Liquid Crystal Display Device

Figure 4:
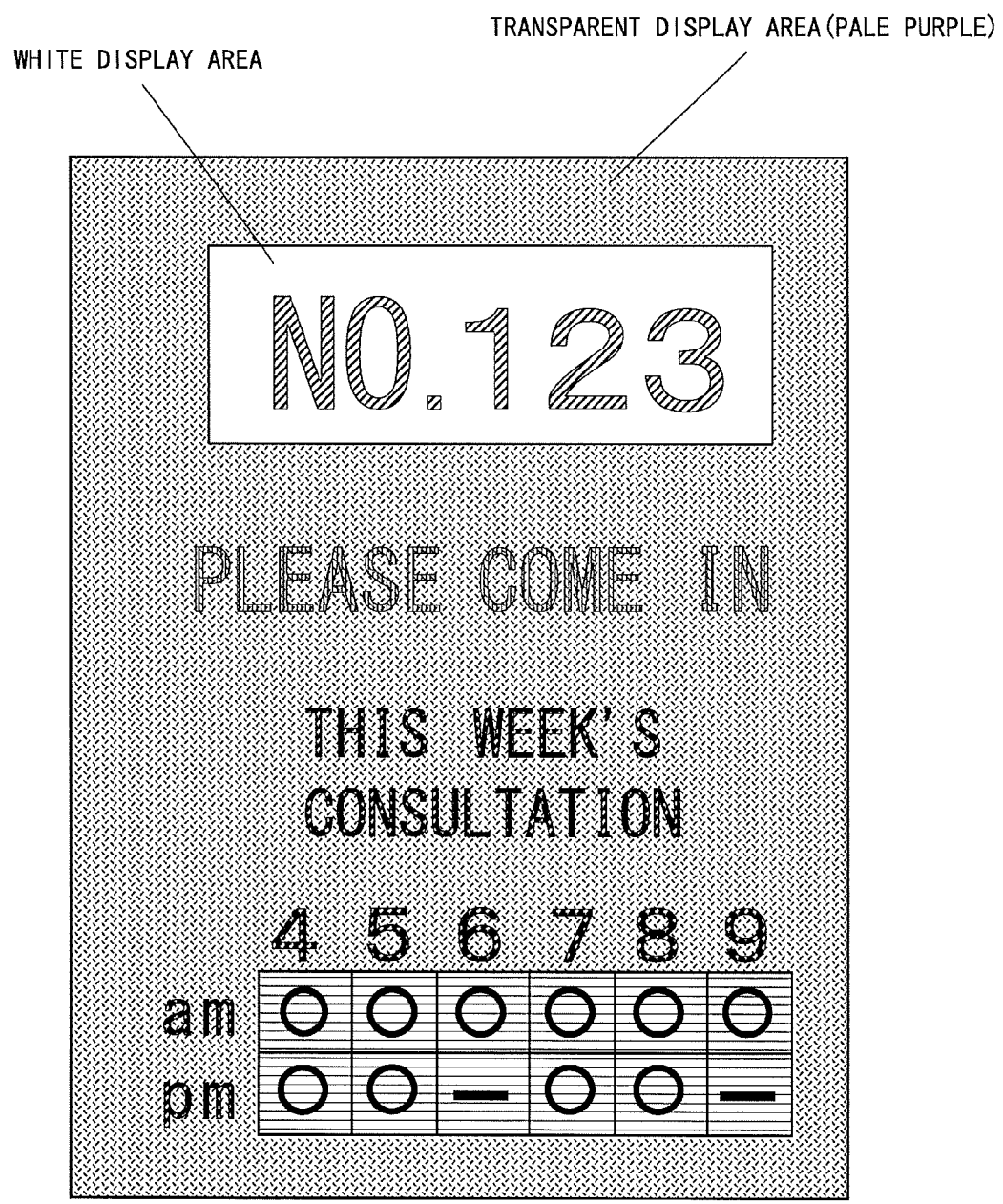
FIG. 4 is a view showing an image viewed by an observer when the image is displayed by a field-sequential system provided with four subfields in the liquid crystal display device shown in FIG. 1.
Figure 17:
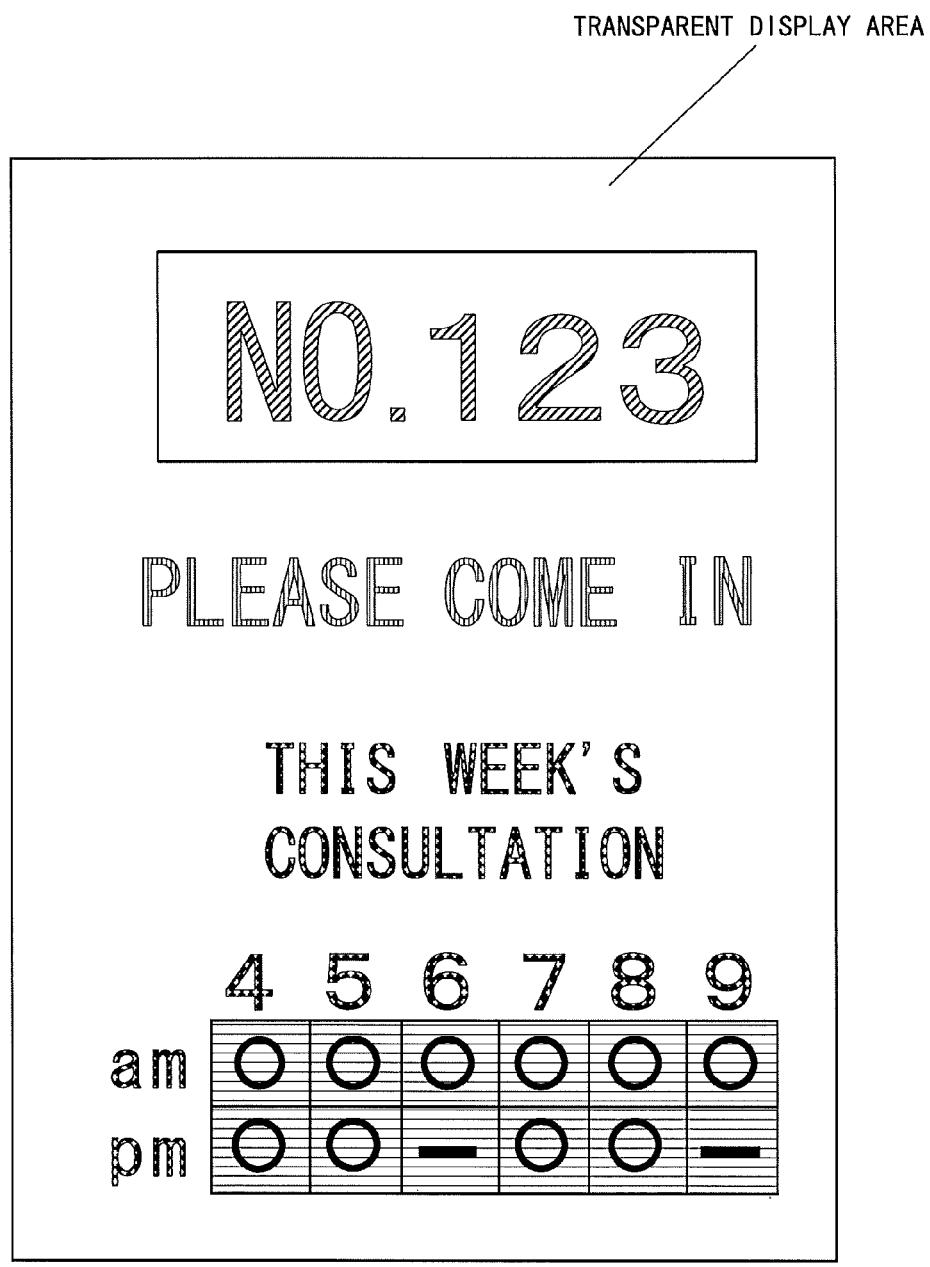
FIG. 17 is a view showing an image viewed by the observer when the image is displayed by the field-sequential system shown in FIG. 16.
Figure 18:
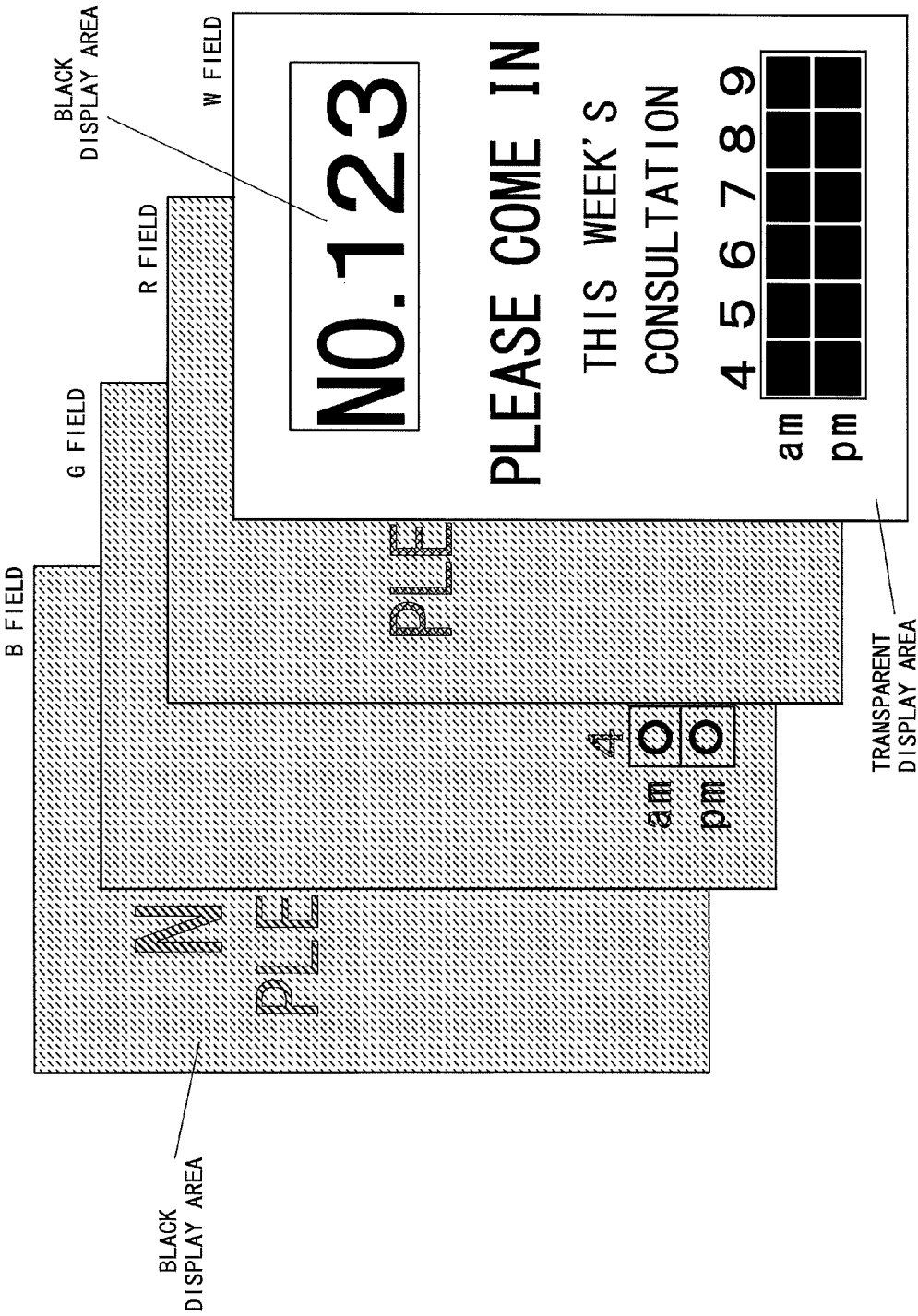
FIG. 18 is a view showing an image of each subfield when the image shown in FIG. 17 is displayed by the field-sequential system.
Figure 19:
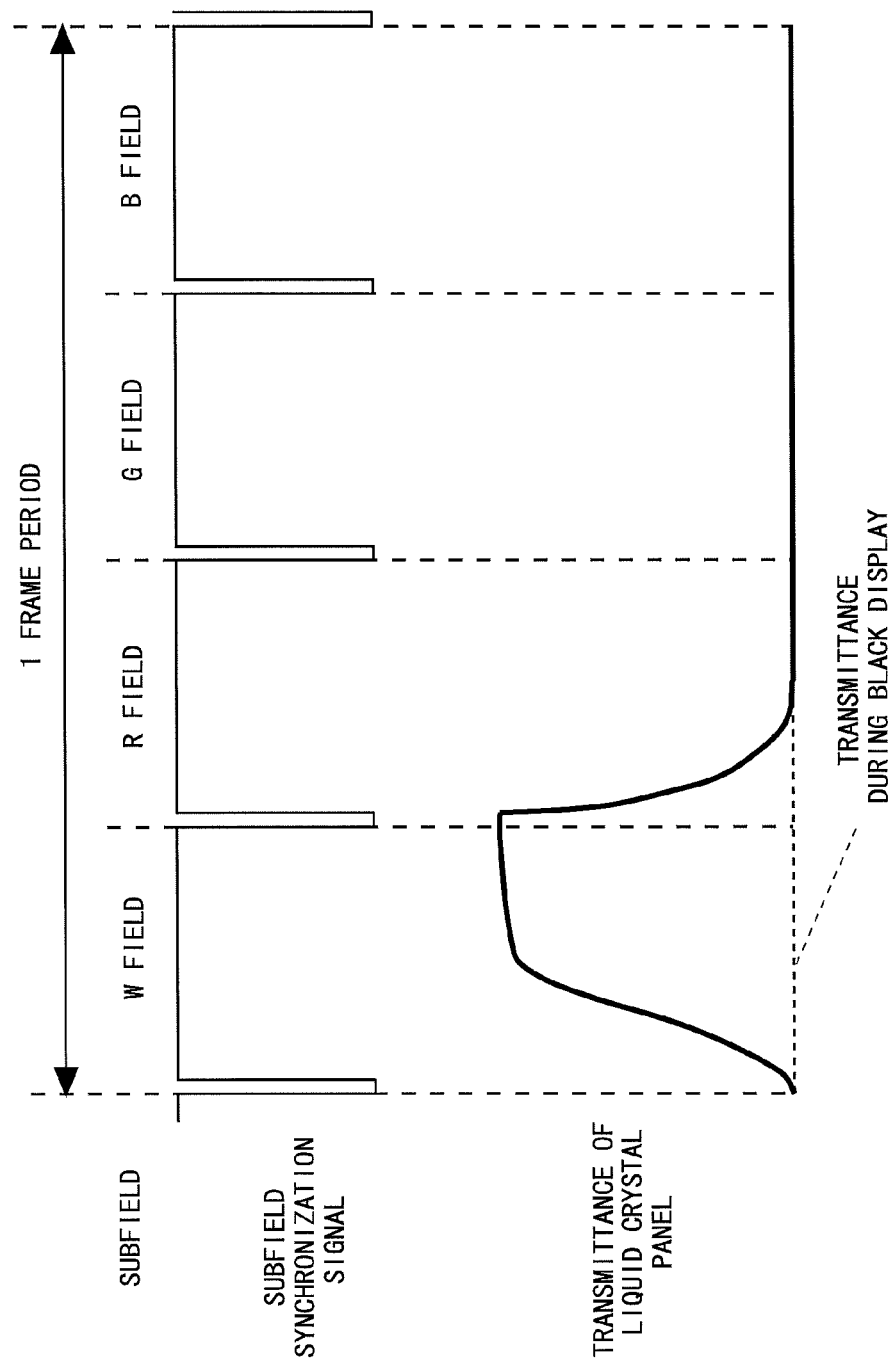
FIG. 19 is a diagram showing transmittances of the liquid crystal panel in the four subfields constituting one frame at the time of displaying an image on the liquid crystal display device by the field-sequential system shown in FIG. 17.

FIG. 4 is a view showing an image viewed by the observer when the image is displayed by a field-sequential system provided with four subfields in the liquid crystal display device 100 shown in FIG. 1. In the image shown in FIG. 4, similarly to the image shown in FIG. 17, characters of "No. 123" are displayed in blue, characters of "Please come in" are displayed in pink, characters of "This week's consultation" and the consultation dates and times are displayed in green, and a consultation timetable is displayed in yellow. The inside of a rectangular area surrounding the characters of "No. 123" is displayed so as to appear white (displayed in white). Further, the area other than the characters, the consultation timetable, and the inside of the rectangular area, that is, the area displayed in pale purple, is a transparent display area that transmits light from the inside of the casing 10, and is transparently displayed such that the inside of the casing 10 is viewable through the transparent display area.

Figure 5:
FIG. 5 is a view showing a transparent display area and a black display area in the image shown in FIG. 4.

FIG. 5 is a view showing the transparent display area and a black display area in the image shown in FIG. 4. In the image shown in FIG. 4, the transparent display area is extracted. As described above, the transparent display area is the area displayed in pale purple, that is, the area other than the characters, the consultation timetable, and the inside of the rectangular area, and the characters, the consultation timetable, and the like which are not included in the transparent display area are written in black, so as to be brought into a black display state where they are displayed in black. Data of this transparent display area is extracted from the input image signal Sin in the transparent-display-area extraction circuit 15 of the liquid crystal display device 100, and provided as the transparent display data Dtd to the subfield generation circuit 21 of the control circuit 20 together with the input image signal Sin.

When the subfield generation circuit 21 is provided with the transparent display data Dtd, the subfield generation circuit 21 reads from the register 22 the transparency setting data Dts required for setting the transparent display area. The transparency setting data Dts includes the gradation value of the transparent display area, the display color of the transparent display area, and the like. For example, when the liquid crystal panel 60 is the normally white type panel, "Gradation value 0" with the highest transmittance is set as a gradation value of the transparent display area, and when the liquid crystal panel 60 is the normally black type liquid crystal panel with 256 gradation values, "Gradation value 255" with the highest transmittance is set as a gradation value of the transparent display area. Further, the display color of the transparent display area can be optionally set by adjusting a light amount of each of the red, green and blue LEDs in each subfield, and in FIG. 4, the display color of the transparent display area has been set to pale purple. In this manner, the subfield generation circuit 21 reads the gradation value and the display color of the transparent display area from the register 22, provides the gradation value of the transparent display area to the display control circuit 23 together with the subfield image signal Ssf and the synchronizing signal Ssyc, and provides the display color of the transparent display area to the backlight control circuit 24 together with the backlight control signal Sbc.

Figure 6:
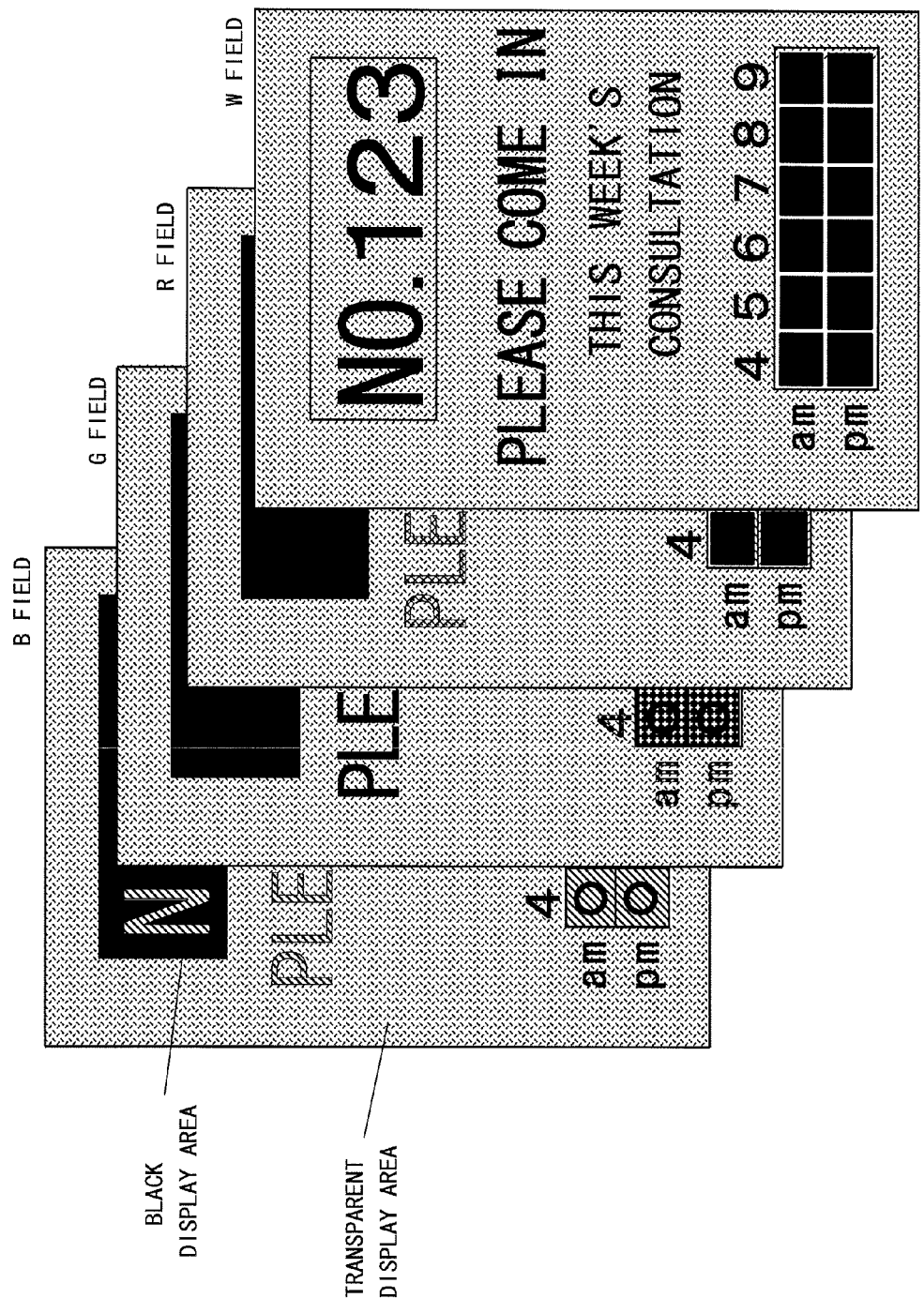
FIG. 6 is a view showing an image of each subfield when the image shown in FIG. 4 is displayed by the field-sequential system.

FIG. 6 is a view showing an image of each subfield when the image shown in FIG. 4 is displayed by the field-sequential system. A description is given of a case where such an image is displayed in the W field and each of the subfields of R, G, B by the field-sequential system. In the W field, an image is displayed based on brightness information and the transparent display data Dtd obtained from the input image signal Sin, and in each of the subfields of R, G, B, an image is displayed based on color information and the transparent display data Dtd obtained from the input image signal Sin.

First, in the W field, while the characters of "No. 123", the characters of "Please come in", the characters representing the consultation dates and times, and the consultation timetable are written in black so as to prevent transmission of backlight, the transparent display area and the inside of the rectangular area surrounding the characters of "No. 123", the area except for the characters of "No. 123", are made transparent, and the red, green and blue LEDs are simultaneously lighted. At this time, the characters and the consultation timetable which are displayed in each of the subfields of R, G, B become the black display area that has been written in black so as to prevent transmission of any of red light, green light and blue light. Further, the area other than the inside of the rectangular area surrounding the characters of "No. 123" and the black display area become the transparent display area where the red light, green light, and blue light are transmitted.

Next, based on the color information, an image is displayed in each of the subfields of R, G, B. That is, in the R field, the characters of "Please come in", and the transparent display area become transparent and the red LED is lighted, thus leading to transmission of red light through these transparent areas. At this time, the whole of the rectangular area including the characters of "No. 123", the characters representing the consultation dates and times, and the consultation timetable have been written in black and is in the black display state so as to prevent transmission of the red light.

In the G field, the characters of "This week's consultation", the characters representing the consultation dates and times, and the consultation timetable become transparent and the green LED is lighted, thus leading to transmission of green light through these transparent areas. At this time, the rectangular area surrounding the characters of "Please come in" and the characters of "No. 123" has been written in black and is in the black display state.

In the B field, the characters of "No. 123", the characters of "Please come in", the consultation timetable, and the transparent display area become transparent and the blue LED is lighted, thus leading to transmission of blue light through these transparent areas. At this time, the inside of the rectangular area surrounding the characters of "No. 123" has been written in black and is in the black display state except for the characters of "No. 123", and hence the blue light is transmitted only through the characters of "No. 123" on the inside of the rectangular area.

As a result, only the blue light is transmitted through the characters of "No. 123", which thus become blue, the blue light and the red light are transmitted through the characters of "Please come in", which thus become pink, only the green light is transmitted through the characters representing the consultation dates and times, which thus become green, and the blue light and the green light are transmitted through the consultation timetable, which thus becomes cyan. Further, through the transparent display area, the blue light, the green light and the red light are transmitted in the W field, the red light is transmitted in the R field, the green light is transmitted in the G field, and the blue light is transmitted in the B field, whereby the transparent display area becomes a display color (pale purple in the present embodiment) set in the register 22. Further, through the inside of the rectangular area surrounding the characters of "No. 123", the blue light, the green light, and the red light are transmitted only in the W field, and hence the inside becomes white.

In this manner, through the transparent display area, the red light, the green light, and the blue light are transmitted in the W field, the red light is transmitted in the R field, the green light is transmitted in the G field, and the blue light is transmitted in the B field, whereby the transparent display area become transparent in each subfield. Hence the observer can clearly view the inside of the casing 10 through the liquid crystal panel 60.

1.3. Effect

Figure 7:
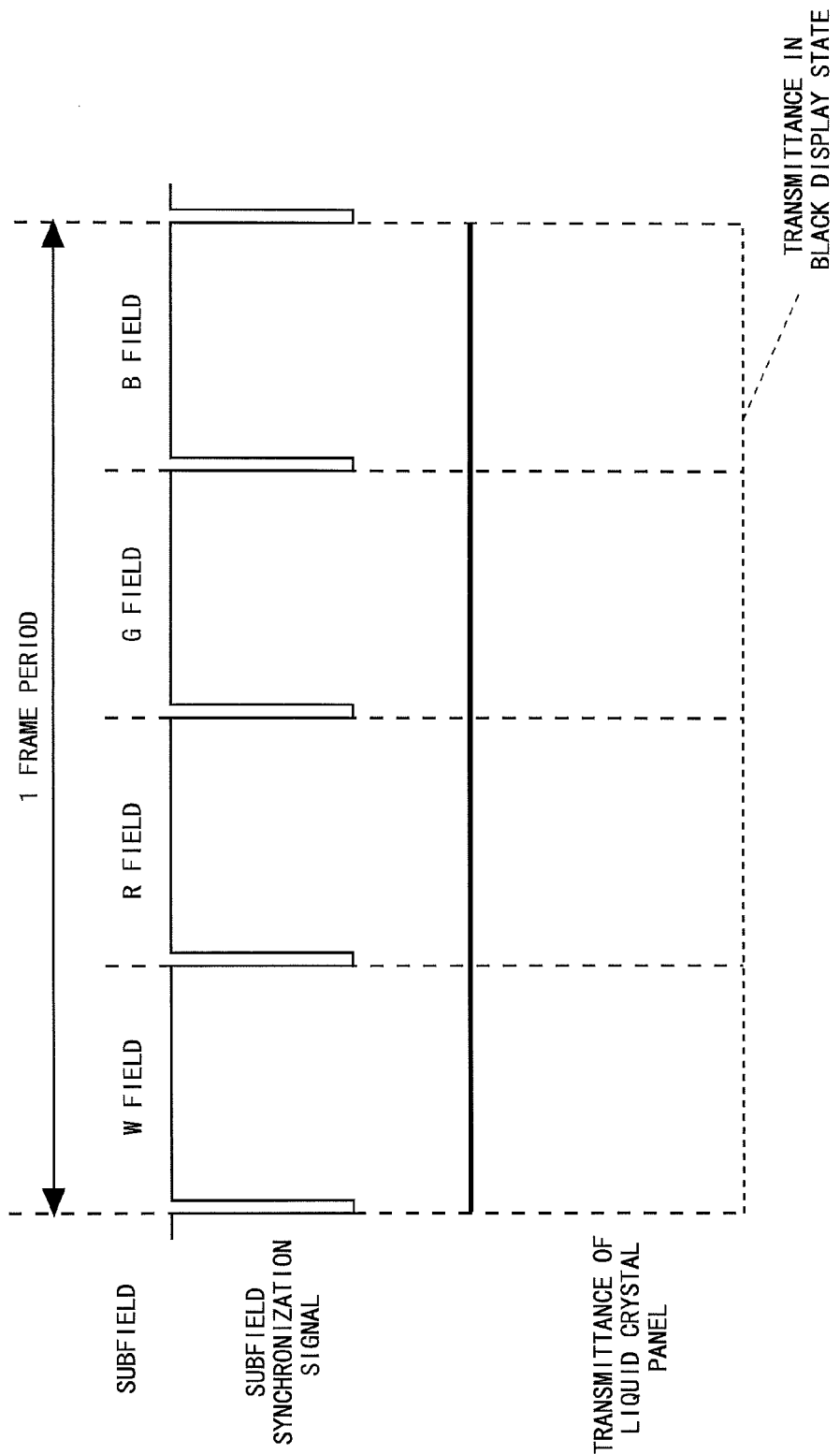
FIG. 7 is a diagram showing a transmittance of a liquid crystal panel in each subfield in the liquid crystal display device shown in FIG. 1.

FIG. 7 is a diagram showing a transmittance of the liquid crystal panel 60 in each subfield in the liquid crystal display device shown in FIG. 1. According to the present embodiment, since the transparent display area is provided not only in the W field but also in each of the subfields of R, G, B, the backlight from the backlight light source portion 50 is transmitted through the transparent display area also in each of the R, G, and B subfields. Thus, as shown in FIG. 7, the transmittance of the liquid crystal panel 60 becomes high not only in the W field but also in each of the subfields of R, G, B, thereby enabling the observer to clearly view the inside of the casing 10. In particular, when the casing 10 is used as a display case for displaying a display object, the display object can be easily viewed by making the liquid crystal panel 60 transparent. Further, a description of the display object is displayed on the liquid crystal panel 60 so that the observer can deepen the understanding of the display object.

1.4 Modified Example

In the above embodiment, the gradation value stored in the register 22 has been assumed to be the gradation value with the highest transmittance. However, the gradation value is not limited to the gradation value with the highest transmittance, and may include a plurality of gradation values with transmittances not lower than a predetermined value. For example, when the liquid crystal panel 60 is the normally white type panel, the gradation value stored in the register 22 may not only be "Gradation value 0", but may also be all gradation values from "Gradation value 0" to "Gradation value 5". In this case, areas to have any gradation value from "Gradation value 0" to "Gradation value 5" all become the transparent display areas. Further, the gradation values do not have to be consecutive, and may be inconsecutive such as "Gradation value 0", "Gradation value 2", and "Gradation value 5". In this case, only the areas having "Gradation value 0", "Gradation value 2", and "Gradation value 5" become the transparent display areas, and the areas having "Gradation value 3" and "Gradation value 4" do not become the transparent display areas. In any case, the area having any gradation value of the plurality of gradation values becomes the transparent display area, thereby making the transparent display area of the liquid crystal panel 60 wide and the background easily viewable.

2. Second Embodiment

2.1 Configuration of Liquid Crystal Display Device

Figure 8:
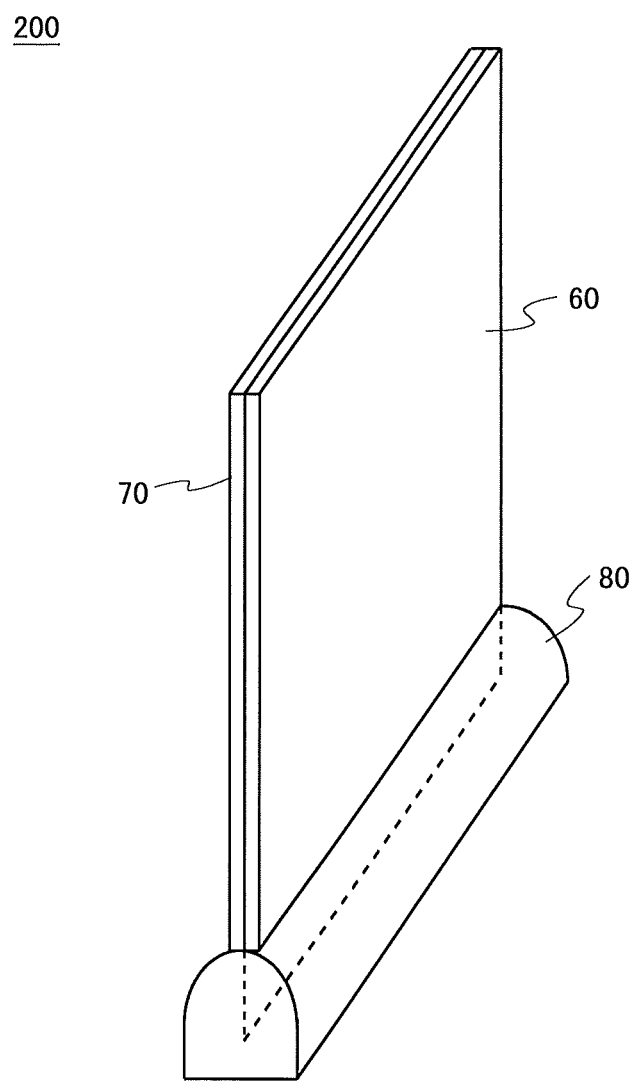
FIG. 8 is an external perspective view of a liquid crystal display device according to a second embodiment of the present invention.

FIG. 8 is an external perspective view of a liquid crystal display device 200 according to a second embodiment of the present invention. As shown in FIG. 8, in the liquid crystal display device 200, the liquid crystal panel 60 and a light-guiding plate 70 are fixed to a stand 80 while vertically raised on the floor, and an absorption type polarizing plate (not shown) is adhered to each of the top surface and the rear surface of the liquid crystal panel 60. Note that the liquid crystal display device 200 does not include a casing, differently from the liquid crystal display device 100 shown in FIG. 1.

Figure 9:
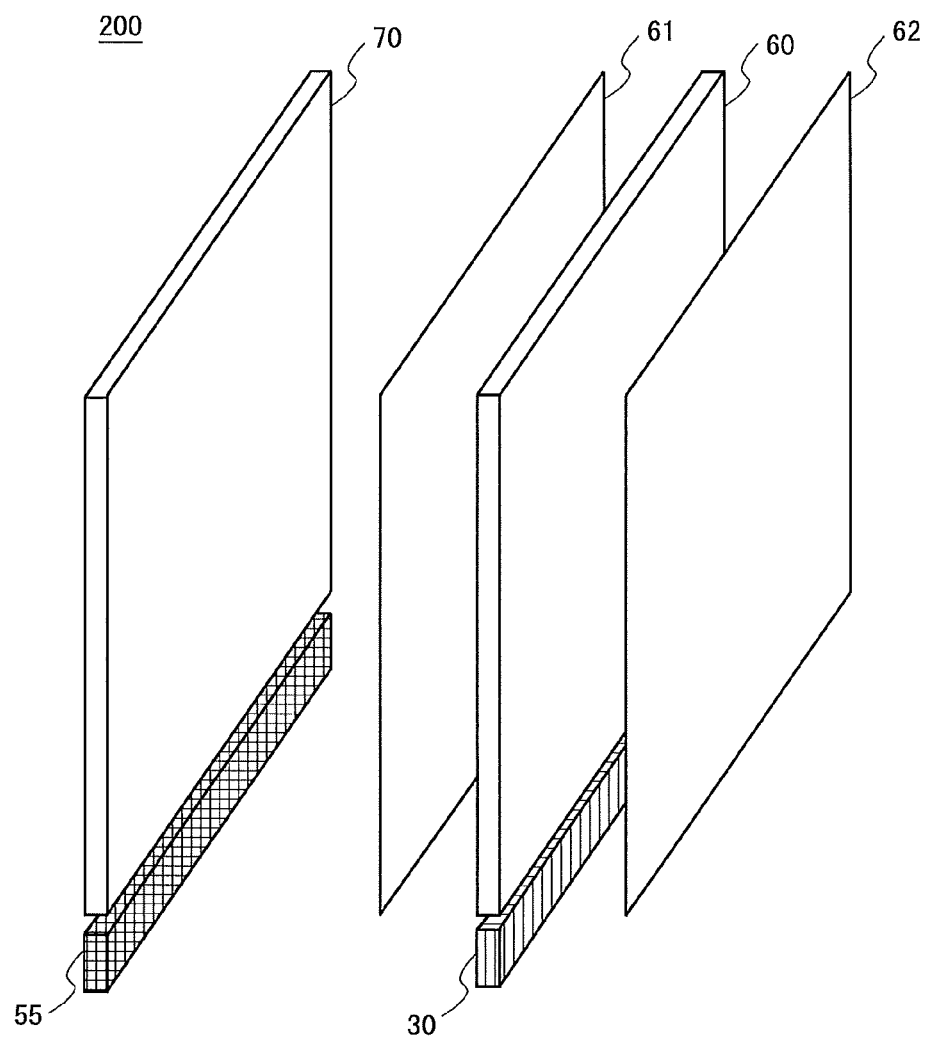
FIG. 9 is an exploded perspective view of the liquid crystal display device shown in FIG. 8.
Figure 10:
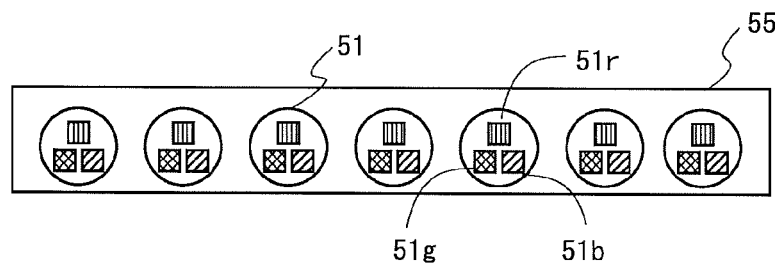
FIG. 10 is a view showing a configuration of LED bars attached to a liquid crystal panel of the liquid crystal display device shown in FIG. 8.

FIG. 9 is an exploded perspective view of the liquid crystal display device 200 shown in FIG. 8. An LED bar 55 shown in FIG. 10 is attached to the lower end of the light-guiding plate 70. In the LED bar 55, LEDs 51 each including one red LED 51*r*, one green LED 51*g*, and one blue LED 51*b* are linearly arranged. Dots (not shown) for reflecting incident light are printed at predetermined intervals on the top surface and the rear surface of the light-guiding plate 70. Backlight emitted from the LED bar 55 is incident on the light-guiding plate 70 and travels upward, while being totally reflected, in the light-guiding plate 70. Further, the panel drive circuit 30 for driving the liquid crystal panel 60 is attached to the lower end of the liquid crystal panel 60. Absorption type polarizing plates 61, 62 are respectively adhered to both surfaces of the liquid crystal panel 60. Further, a control circuit (not shown) for controlling the LED bar 55 and the panel drive circuit 30 is incorporated into the stand 80, and connected to the LED bar 55 and the panel drive circuit 30 in the stand 80. In addition, a block diagram showing a configuration of a liquid crystal display device 200 is the same as the block diagram shown in FIG. 3, and hence the block diagram and the description thereof are omitted. The LED bar 55 may be referred to as a "light source portion".

2.2 Drive Method of Liquid Crystal Display Device

FIGS. 11(A) and 11(B) are sectional views each showing a transmission path of light that is transmitted through the liquid crystal panel 60 and the light-guiding plate 70 of the liquid crystal display device 200 shown in FIG. 8, and more specifically, FIG. 11(A) is a sectional view showing the transmission path of the light when the liquid crystal panel 60 of the liquid crystal display device 200 is in an on-state, and FIG. 11(B) is a sectional view showing the transmission path of the light when the liquid crystal panel 60 is in an off-state. Note that in the present specification, the "front-surface side" refers to the side on which an image is viewable in the liquid crystal display device 200, and the "back-surface side" refers to the side facing the front-surface side of the liquid crystal display device 200.

Further, the liquid crystal panel 60 with the driving image signals written in the pixel formation portions 65 is referred to as a "liquid crystal panel in the on-state", and the liquid crystal panel 60 with the driving image signals not written in the pixel formation portions 65 is referred to as a "liquid crystal panel in the off-state". Light incident on the liquid crystal panel 60 in the on-state has a polarization direction rotated and is transmitted through the liquid crystal panel 60, and light incident on the liquid crystal panel 60 in the off-state does not have a polarization direction rotated and is transmitted through the liquid crystal panel 60. Further, in the following description, the liquid crystal panel 60 is assumed to be the normally white type panel, but it may be the normally black type panel.

First, a description is given of a case where the liquid crystal panel 60 is in the on-state. As shown in FIG. 11(A), dots 71*a*, 71*b* are respectively printed on the top surface and the rear surface of the light-guiding plate 70, and backlight emitted from the LED bar 55 is incident on the light-guiding plate 70 and travels upward, while being totally reflected, in the light-guiding plate 70. The backlight incident on the dot 71*b* formed on the rear surface of the light-guiding plate 70 is reflected by the dot 71*b*, and is emitted from the top surface of the light-guiding plate 70 toward the absorption type polarizing plate 61.

The dots 71*a*, 71*b* are formed by using white opaque ink (organic ultraviolet curable ink, etc.), metallic ink (aluminum, gold, etc.), or the like, for example. Since these types of ink tends to reflect light, when the light traveling inside the light-guiding plate 70 is incident on the dots 71*a*, 71*b*, the light is reflected. Further, in place of the dots 71*a*, 71*b*, shaping dots may be formed on the top surface of the light-guiding plate 70 by use of a press mold, for example. Further, instead of only forming the dots and the shaping dots on the top surface of the light-guiding plate 70, the light-guiding plate 70 may be formed of a material that easily reflects light. The structures that reflect light traveling inside the light-guiding plate 70 and emit the light as described above may be collectively referred to as a "reflection structure".

To the rear surface and the top surface of the liquid crystal panel 60, the absorption type polarizing plates 61, 62 are adhered which absorb polarization waves in which an oscillating direction of an electric field is parallel to a direction of an absorption axis, and transmit polarization waves in which an oscillating direction of an electric field is parallel to an oscillating direction of a transmission axis. The directions of the absorption axis and the transmission axis of each of the absorption type polarizing plates 61, 62 are orthogonal to each other. Further, the absorption type polarizing plate 61 and the absorption type polarizing plate 62 are disposed such that the directions of the absorption axes of those plates and the transmission axes of those plates are respectively parallel to each other. In the present specification, a description is given taking the polarization waves to be absorbed into the absorption type polarizing plates 61, 62 as "P waves" and taking the polarization waves to be transmitted through the absorption type polarizing plates 61, 62 as "S waves" for the sake of convenience, but those waves may be reversed. For this reason, in the present specification, one of these two types of polarization waves may be referred to as "first polarization waves", and the other may be referred to as "second polarization waves".

Of S waves and P waves included in backlight emitted from the light-guiding plate 70, the P waves are absorbed into the absorption type polarizing plate 61, and only the S waves are transmitted through the absorption type polarizing plate 61 and incident on the liquid crystal panel 60. The S waves, which are included in the backlight incident on the liquid crystal panel 60, have a polarization direction rotated 90 degrees and are outputted as P waves. The P waves outputted from the liquid crystal panel 60 are incident on the absorption type polarizing plate 62. Since the absorption type polarizing plate 62 is also the polarizing plate that transmits the S waves and absorbs the P waves, the P waves derived from the backlight incident on the absorption type polarizing plate 62 are absorbed into the absorption type polarizing plate 62. Thus, neither the S waves nor the P waves included in the backlight can reach the front-surface side of the liquid crystal display device 200.

Next, a description is given of a case where light (natural light) representing a background of the liquid crystal display device 200 is incident from the back-surface side of the light-guiding plate 70. The natural light incident from the back-surface side of the light-guiding plate 70 is transmitted through the light-guiding plate 70 and incident on the absorption type polarizing plate 61. At this time, of S waves and P waves included in the natural light, the P waves are absorbed into the absorption type polarizing plate 61, and only the S waves are transmitted through the absorption type polarizing plate 61 and incident on the liquid crystal panel 60. Since the liquid crystal panel 60 is in the on-state, the S waves have a polarization direction rotated 90 degrees and are outputted as P waves. The P waves derived from the natural light incident on the absorption type polarizing plate 62 are absorbed into the absorption type polarizing plate 62. Thus, neither the S waves nor the P waves included in the natural light can reach the front-surface side of the liquid crystal display device 200.

As thus described, when the liquid crystal panel 60 is in the on-state, neither the backlight nor the natural light can reach the front-surface side of the liquid crystal display device 200, and hence the observer can view neither the image in accordance with the input image signal Sin nor the background of the liquid crystal display device 200.

Next, a description is given of a case where the liquid crystal panel 60 is in the off-state. As shown in FIG. 11(B), backlight emitted from the LED bar 55 is reflected by the dot 71b formed on the rear surface of the light-guiding plate 70 and emitted from the top surface of the light-guiding plate 70 toward the absorption type polarizing plate 61. Of the S waves and the P waves included in the backlight, the P waves are absorbed into the absorption type polarizing plate 61, and only the S waves are transmitted through the absorption type polarizing plate 61 and incident on the liquid crystal panel 60.

Since the liquid crystal panel 60 is in the off-state, the incident S waves do not have a polarization direction rotated and are incident on the absorption type polarizing plate 62. Since the absorption type polarizing plate 62 is also the polarizing plate that transmits the S waves and absorbs the P waves, the S waves incident on the absorption type polarizing plate 62 are transmitted without being absorbed into the absorption type polarizing plate 62. Thus, the S waves derived from the backlight reach the front-surface side of the liquid crystal display device 200.

Next, a description is given of the natural light incident from the back-surface side of the liquid crystal display device 200. The natural light incident from the back-surface side is transmitted through the light-guiding plate 70 and incident on the absorption type polarizing plate 61. Of the S waves and the P waves included in the backlight, the P waves are absorbed into the absorption type polarizing plate 61, and only the S waves are transmitted through the absorption type polarizing plate 61 and incident on the liquid crystal panel 60. Since the liquid crystal panel 60 is in the off-state, the incident S waves do not have a polarization direction rotated and transmitted, and are incident on the absorption type polarizing plate 62. Since the absorption type polarizing plate 62 is also the polarizing plate that transmits the S waves and absorbs the P waves, the S waves derived from the natural light and incident on the absorption type polarizing plate 62 are transmitted without being absorbed into the absorption type polarizing plate 62. Thus, the S waves derived from the natural light reach the front-surface side of the liquid crystal display device 200.

As thus described, when the liquid crystal panel 60 is in the off-state, both the backlight and the natural light reach the front-surface side, and hence the observer can view the image in accordance with the input image signal Sin, overlapping with the background of the liquid crystal display device 200. Note that the intensity of the backlight is higher than the intensity of the natural light, thus enabling the observer to view the image more clearly than the background.

Note that in the above description, both the two absorption type polarizing plates 61, 62 adhered to the liquid crystal panel 60 have been assumed to be the polarizing plates that absorb P waves and transmit S waves. However, a similar effect to that in the above case can be obtained when polarizing plates that absorb S waves and transmit P waves are respectively adhered to both surfaces of the liquid crystal panel in place of the absorption type polarizing plates 61, 62.

Although the liquid crystal panel 60 has been assumed to be the normally white type liquid crystal panel in the above description, the normally black type liquid crystal panel may be used in place of the normally white type. In the case of using the normally black type liquid crystal panel, the liquid crystal panel 60 is in the off-state in FIG. 11(A) and is in the on-state in FIG. 11(B), differently from the case of using the normally white type liquid crystal panel.

Further, in the above description, it has been assumed that the dots 71a, 71b are respectively formed on the top surface and the rear surface of the light-guiding plate 70. However, the light reflected by the dot 71a formed on the top surface of the light-guiding plate 70 travels from the rear surface of the light-guiding plate 70 toward the outside of the liquid crystal display device 200, and is not used for displaying an image. Accordingly, the dots formed on the light-guiding plate 70 may be only the dots 71b formed on the rear surface.

Although it has been assumed in the above description that the liquid crystal panel 60 and a light-guiding plate 70 are fixed while vertically raised on the floor, the liquid crystal panel 60 and the light-guiding plate 70 may be fixed so that the background is viewable, and for example, it may be fixed to a wall inside a room, or to a ceiling.

2.3 Effect

According to the present embodiment, the same effect as that of the liquid crystal display device 100 according to the first embodiment can be obtained. Further, since the liquid crystal display device 200 of the present embodiment does not include a casing, an installation place of the liquid crystal display device 200 is not restricted by the casing. Accordingly, the liquid crystal display device 200 can be used for wider applications.

3. Third Embodiment 3.1 Configuration of Liquid Crystal Display Device

Figure 12:
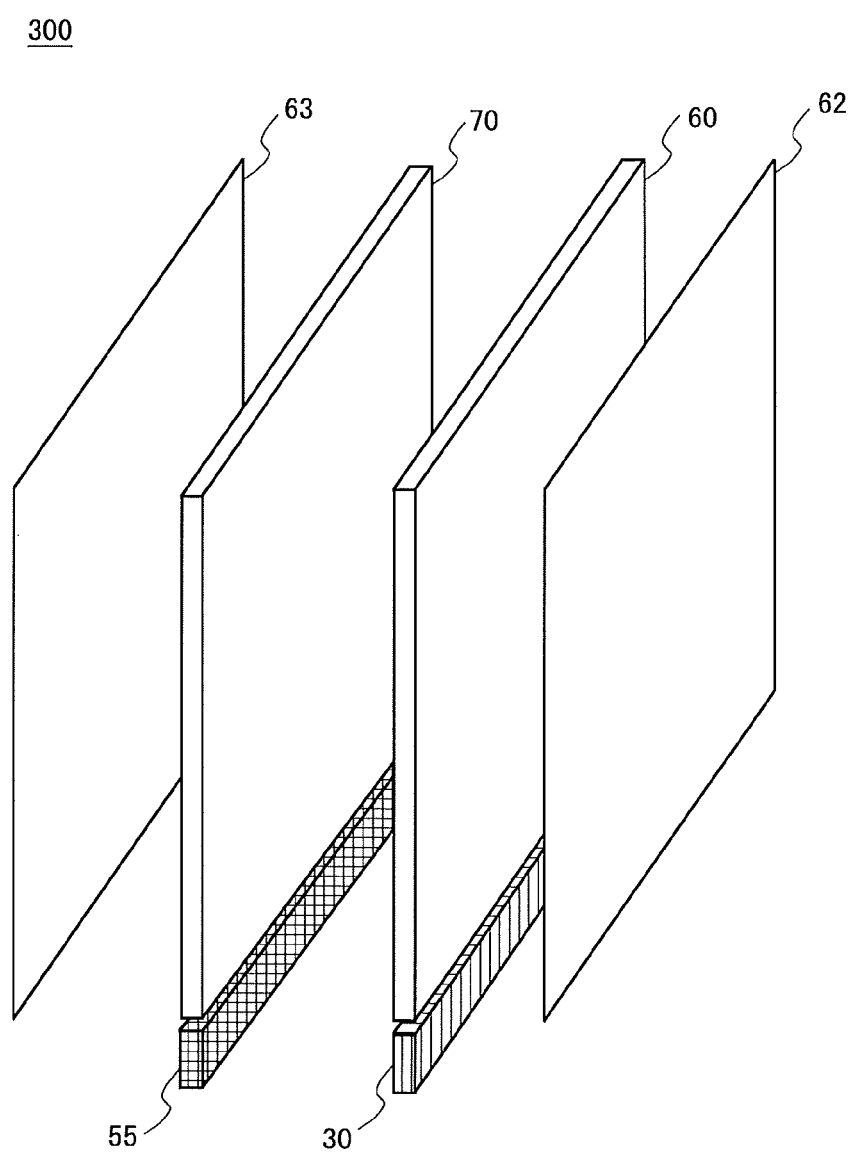
FIG. 12 is an exploded perspective view of a liquid crystal display device according to a third embodiment of the present invention.

An external perspective view of a liquid crystal display device 300 according to a third embodiment of the present invention is the same as the external perspective view of the liquid crystal display device 200 shown in FIG. 8, and hence the external perspective view and the description thereof are omitted. FIG. 12 is an exploded perspective view of the liquid crystal display device 300 according to the third embodiment of the present invention. As shown in FIG. 12, in the liquid crystal display device 300 according to the present embodiment, the absorption type polarizing plate 62 is adhered to the top surface of the liquid crystal panel 60 similarly to the liquid crystal panel 60 shown in FIG. 9. However, differently from the case of the liquid crystal panel 60 in the liquid crystal display device 200 shown in FIG. 9, the absorption type polarizing plate 61 is not adhered, and instead, a reflection type polarizing plate 63 is adhered to the front-surface-side surface of the light-guiding plate 70. Note that the liquid crystal display device 300 does not include a casing, similarly to the liquid crystal display device 200.

Further, the LED bar 55 is attached to the lower end of the light-guiding plate 70, the panel drive circuit 30 is attached to the lower end of the liquid crystal panel 60, and these are connected to the control circuit 20 inside the stand 80. This is the same as in the case of the liquid crystal display device 200 shown in FIG. 9, and hence the description thereof is omitted. Further, a block diagram of the liquid crystal display device 300 is the same as the block diagram of the liquid crystal display device 100 shown in FIG. 1, and hence the block diagram and the description thereof are omitted.

3.2 Drive Method of Liquid Crystal Display Device

Figure 13:
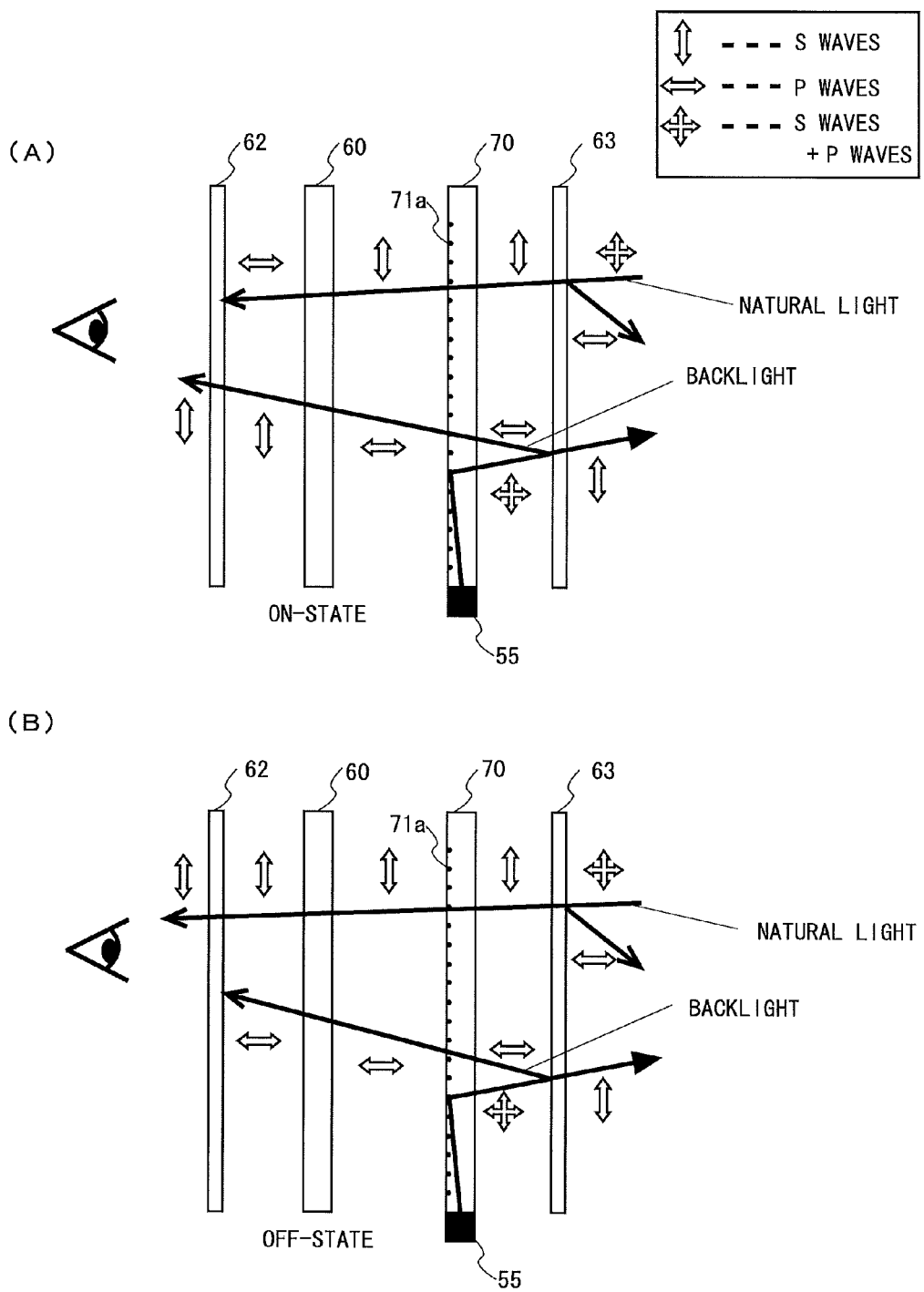
FIGS. 13(A) and 13(B) are sectional views each showing a transmission path of light that is transmitted through the liquid crystal panel and a light-guiding plate of the liquid crystal display device shown in FIG. 12, and more specifically.

FIGS. 13(A) and 13(B) are sectional views each showing a transmission path of light that is transmitted through the liquid crystal panel 60 and the light-guiding plate 70 of the liquid crystal display device 300 shown in FIG. 12, and more specifically, FIG. 13(A) is a sectional view showing the transmission path of the light when the liquid crystal panel 60 of the liquid crystal display device 300 is in the on-state, and FIG. 13(B) is a sectional view showing the transmission path of the light when the liquid crystal panel 60 is in the off-state.

Also in the present embodiment, the liquid crystal panel 60 is assumed to be the normally white type panel. First, a description is given of a case where the liquid crystal panel 60 is in the on-state. As shown in FIG. 13(A), backlight emitted from the LED bar 55 is incident on the light-guiding plate 70 and travels upward, while being totally reflected, in the light-guiding plate 70. In this light-guiding plate 70, differently from the light-guiding plate 70 shown in FIG. 11, the dots 71a are printed only on the top surface of the light-guiding plate 70. For this reason, when the backlight emitted from the LED bar 55 is incident on the dot 71a printed on the top surface of the light-guiding plate 70 at the time of traveling upward in the light-guiding plate 70, the backlight is reflected by the dot 71a and emitted from the rear surface of the light-guiding plate 70 toward the reflection type polarizing plate 63.

The reflection type polarizing plate 63 is disposed on the back-surface side of the light-guiding plate 70. A direction of a reflection axis of the reflection type polarizing plate 63 is orthogonal to a direction of a transmission axis. Further, the reflection type polarizing plate 63 and the absorption type polarizing plate 62 are disposed such that the directions of the reflection axis of the reflection type polarizing plate 63 and the absorption axis of the absorption type polarizing plate 62 are parallel to each other, and the directions of the transmission axes of those plates are parallel to each other. The reflection type polarizing plate 63 is a polarizing plate that reflects P waves and transmits S waves. Accordingly, of the S waves and the P waves which are included in the backlight incident on the reflection type polarizing plate 63, the S waves are transmitted through the reflection type polarizing plate 63 and get out of the liquid crystal display device 300. Meanwhile, the P waves are reflected by the reflection type polarizing plate 63, transmitted through the light-guiding plate 70, and incident on the liquid crystal panel 60.

Since the liquid crystal panel 60 is in the on-state, the P waves incident on the liquid crystal panel 60 have a polarization direction rotated 90 degrees and output as S waves, and are incident on the absorption type polarizing plate 62. The absorption type polarizing plate 62 is a polarizing plate that transmits S waves and absorbs P waves. Thus, the S waves derived from the backlight are transmitted through the absorption type polarizing plate 62 and reach the front-surface side of the liquid crystal display device 300.

Next, a description is given of natural light incident from the back-surface side of the liquid crystal display device 300. The natural light is incident on the reflection type polarizing plate 63 from the back-surface side. Since the reflection type polarizing plate 63 is the polarizing plate that reflects P waves and transmits S waves, of the S waves and the P waves included in the natural light, only the S waves are sequentially transmitted through the reflection type polarizing plate 63 and the light-guiding plate 70, and incident on the liquid crystal panel 60. Since the liquid crystal panel 60 is in the on-state, the incident S waves have a polarization direction rotated 90 degrees and are outputted as P waves, to be incident on the absorption type polarizing plate 62. Since the absorption type polarizing plate 62 transmits S waves and absorbs P waves, the P waves derived from the natural light are absorbed into the absorption type polarizing plate 62, and cannot reach the front-surface side of the liquid crystal display device 300.

As thus described, when the liquid crystal panel 60 is in the on-state, only the backlight reaches the front-surface side of the liquid crystal display device 300, and hence the observer on the front-surface side can only view the image in accordance with the input image signal Sin, and cannot view the background.

Next, a description is given of a case where the liquid crystal panel 60 is in the off-state. As shown in FIG. 13(B), the backlight emitted from the LED bar 55 is described. Similarly to the above case where the liquid crystal panel 60 is in the on-state, when the S waves are incident on the reflection type polarizing plate 63, of the S waves and the P waves included in the backlight, the S waves are transmitted through the reflection type polarizing plate 63 and get out of the liquid crystal display device 300. Meanwhile, the P waves are reflected by the reflection type polarizing plate 63, transmitted through the light-guiding plate 70, and incident on the liquid crystal panel 60.

Since the liquid crystal panel 60 is in the off-state, the P waves incident on the liquid crystal panel 60 do not have a polarization direction rotated and are incident on the absorption type polarizing plate 62. Since the absorption type polarizing plate 62 transmits S waves and absorbs P waves, the P waves derived from the backlight are absorbed into the absorption type polarizing plate 62, and cannot reach the front-surface side of the liquid crystal display device 300.

Next, a description is given of natural light incident from the back-surface side of the liquid crystal display device 300. Of the S waves and the P waves included in the natural light, the P waves are reflected by the reflection type polarizing plate 63, and only the S waves are transmitted through the reflection type polarizing plate 63 and further transmitted through the light-guiding plate 70, to be incident on the liquid crystal panel 60.

Since the liquid crystal panel 60 is in the off-state, the S waves do not have a polarization direction rotated and are outputted, to be incident on the absorption type polarizing plate 62. Since the absorption type polarizing plate 62 transmits S waves and absorbs P waves, the incident S waves are transmitted through the absorption type polarizing plate 62. Thus, the S waves derived from the natural light reach the front-surface side of the liquid crystal display device 300.

As thus described, when the liquid crystal panel 60 is in the off-state, only the natural light reaches the front-surface side of the liquid crystal display device 300, and hence the observer on the front-surface side cannot view the image in accordance with the input image signal Sin, but can view the background.

Figure 14:
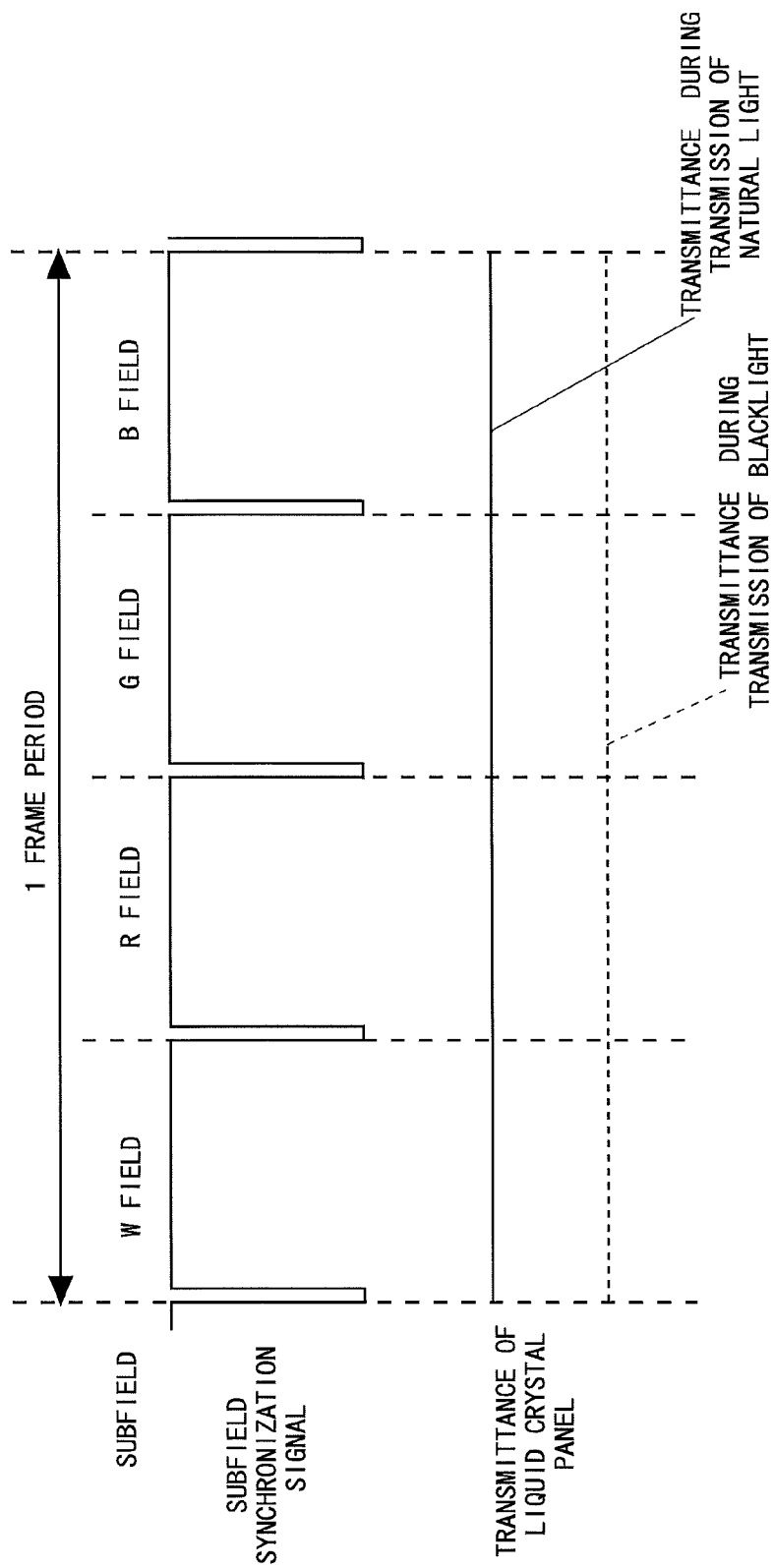
FIG. 14 is a diagram showing a transmittance of the liquid crystal panel in each subfield in the liquid crystal display device shown in FIG. 12.

FIG. 14 is a diagram showing a transmittance of the liquid crystal panel 60 in each subfield in the liquid crystal display device 300 shown in FIG. 12. In the present embodiment, differently from the cases of the first and second embodiments, either the backlight or the natural light is transmitted to the front-surface side of the liquid crystal display device 300, and the backlight and the natural light are not simultaneously transmitted. FIG. 14 represents the transmittance of the liquid crystal panel 60 at the time of transmission of the backlight and the transmittance of the liquid crystal panel 60 at the time of transmission of the natural light. As shown in FIG. 14, not only the transmittance of the liquid crystal panel 60 in transmitting the natural light is high, similarly to the case shown in FIG. 7, but also the transmittance in transmitting the backlight is higher than that at the time of the black display state. As thus described, in the present embodiment, the backlight and the natural light can be switched by switching the on/off state of the liquid crystal panel 60, but the black display, which prevents transmission of either light, cannot be performed as in the case shown in FIG. 7. However, not only the brightness of the background but also the brightness of the image increases, thereby also making the image easily viewable. Further, the transmittance of the liquid crystal panel 60 at the time of transmission of the natural light is high compared to that at the time of transmission of the backlight, thereby enabling the observer to clearly view the background.

Note that in the above description, the absorption type polarizing plate 62 adhered to the liquid crystal panel 60 has been assumed to be the polarizing plate that absorbs P waves and transmits S waves. However, a similar effect to that in the above description can be obtained even when an absorption type polarizing plate that absorbs S waves and transmits P waves is adhered to the top surface of the liquid crystal panel 60 in place of the absorption type polarizing plate 62, and a reflection type polarizing plate that reflects S waves and transmits P waves is adhered to the rear surface of the light-guiding plate 70 in place of the reflection type polarizing plate 63.

Although the liquid crystal panel 60 has been assumed to be the normally white type panel in the above description, the normally black type liquid crystal panel may be used in place of the normally white type liquid crystal panel 60. In this case, the observer on the front-surface side of the liquid crystal display device can view the image when the liquid crystal panel is in the off-state and can view the background when the liquid crystal panel is in the on-state. However, differently from the above description, it is P waves that reach the front-surface side of the liquid crystal display device both when the liquid crystal panel is in the on-state and when the liquid crystal panel is in the off-state.

3.3 Effect

According to the present embodiment, similarly to the case of the first embodiment, the background of the liquid crystal display device 300 can be clearly viewed. Since only the background is viewable when the liquid crystal panel 60 is in the off-state and only the image is viewable when the liquid crystal panel 60 is in the on-state, the black display cannot be performed, but the background and the image are not viewed overlapping with each other. Thus, switching the on-state and the off-state of the liquid crystal panel 60 enables the observer to not only clearly view the background, but also more easily view the image.

4. Fourth Embodiment

An external perspective view of a liquid crystal display device according to a fourth embodiment of the present invention and a block diagram showing a configuration of the liquid crystal display device are respectively the same as the external perspective view of the liquid crystal display device 100 shown in FIG. 1 and the block diagram showing the configuration of the liquid crystal display device 100 shown in FIG. 3, and hence the external perspective view, the block diagram, and descriptions thereof are omitted.

In the first embodiment, for example, the gradation value of the transparent display area of the normally white type liquid crystal panel 60 has been assumed to be "Gradation value 0" with the highest transmittance. However, when the transmittance of the transparent display area is set so as to be the highest, a brightness difference between the image and the transparent display area becomes large, to thereby cause the problem of making the brightness of the image relatively low and the image difficult to view.

In the present embodiment, the transmittance of the transparent display area of the liquid crystal panel 60 is not set to the highest state, but to a state lower than the highest. For example, in the case of the normally white type liquid crystal panel, the gradation value of the transparent display area is not set to "Gradation value 0", but to "Gradation value 50" representing lower brightness than "Gradation value 0". This makes the transparent display area to be displayed not as an area having the brightness of "Gradation value 0", but as an area having the brightness of "Gradation value 50" lower than "Gradation value 0".

Such a gradation value of the transparent display area is previously stored as one of the transparency setting data Dts into the register 22 in the block diagram shown in FIG. 3. Hence, when the subfield generation circuit 21 is provided with the transparent display data Dtd from the transparent-display-area extraction circuit 15 together with the input image signal Sin, the subfield generation circuit 21 reads the transparency setting data Dts required for setting the transparent display area from the register 22, and provides the transparency setting data Dts to the display control circuit 23 together with the subfield image signal Ssf and the like. The display control circuit 23 controls the panel drive circuit 30 based on the transparency setting data Dts and controls the gradation value of the transparent display area displayed on the liquid crystal panel 60.

Note that in the present embodiment, the transparent display area displayed on the liquid crystal panel 60 of the liquid crystal display device 100 shown in FIG. 1 have been described. However, this also applies to the transparent display area displayed on each of the liquid crystal panel 60 of the liquid crystal display device 200 shown in FIG. 8 and the liquid crystal panel 60 of the liquid crystal display device 300 shown in FIG. 12, and hence the descriptions thereof are omitted.

4.1. Effect

Figure 15:
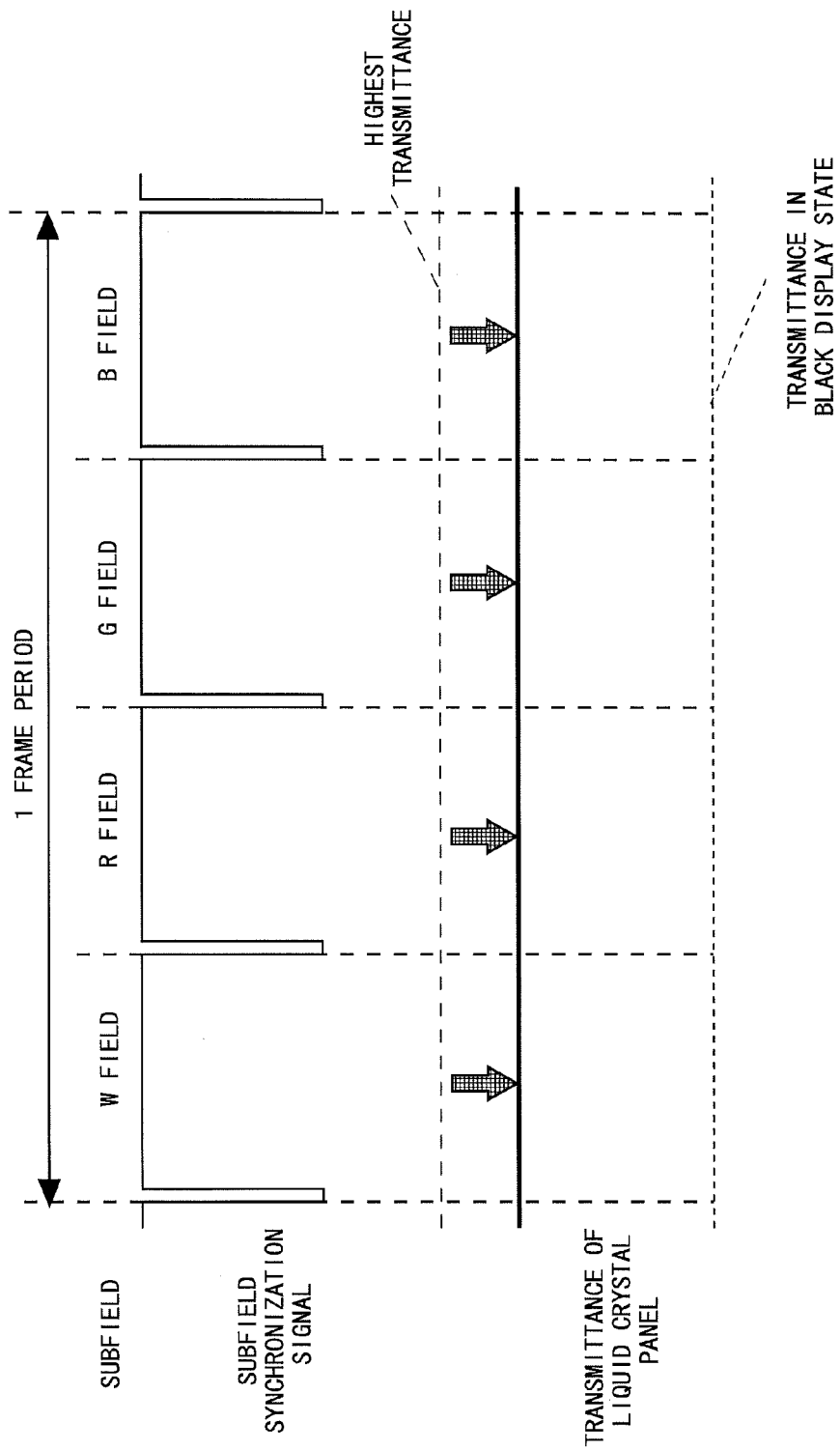
FIG. 15 is a diagram showing another example of the transmittance of the liquid crystal panel in each subfield in the liquid crystal display device shown in FIG. 1.
Figure 16:
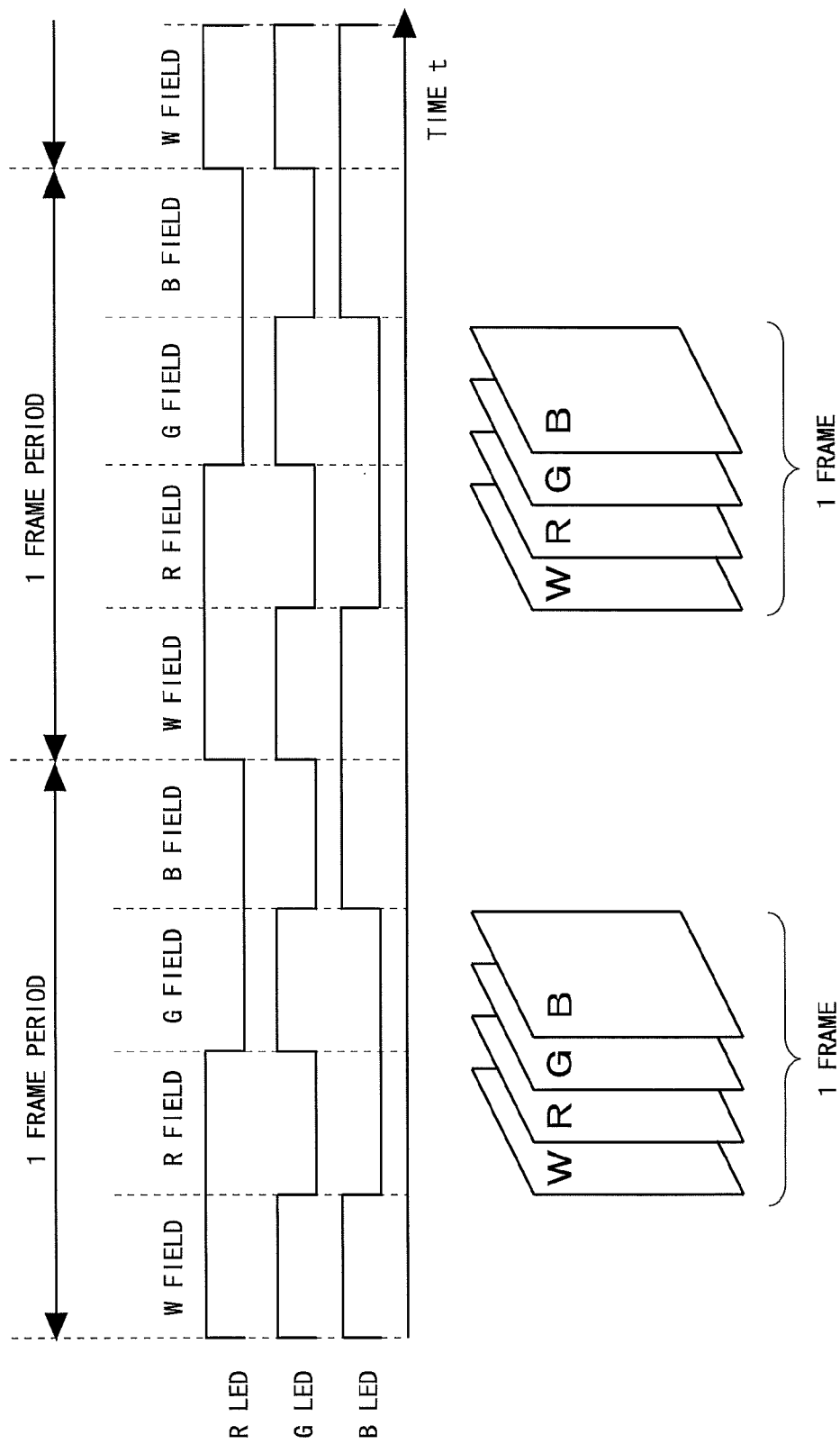
FIG. 16 is a diagram showing light emission states of LEDs, and four subfields constituting one frame, in the case of displaying an image by the field-sequential system provided with the four subfields in a conventional example.

FIG. 15 is a diagram showing another example of the transmittance of the liquid crystal panel 60 in each subfield in the liquid crystal display device 100 shown in FIG. 1. According to the present embodiment, as shown in FIG. 15, the transmittance of the liquid crystal panel 60 is set higher than the transmittance in the black display state, and is set lower than the highest transmittance in all the fields from the W field to the B field. This prevents the brightness of the transparent display area from becoming excessively high and prevents the brightness difference between the image and the transparent display area from becoming large. Hence the problem of the image appearing dark is solved and the image is displayed in a more natural state.

4.2 Modified Example

In the above embodiment, it has been described that the transmittance with the gradation value stored in the register 22 is higher than the transmittance in the black display state, and is lower than the highest transmittance. However, similarly to the case of the modified example of the first embodiment, in the present modified example, the gradation value is not limited to one gradation value, and a plurality of gradation values corresponding to a plurality of transmittances included in the above range and different from each other may be used. The plurality of gradation values may include consecutive gradation values or include inconsecutive gradation values. In any case, the area having any gradation value of the plurality of gradation values becomes the transparent display area, thereby making the transparent display area of the liquid crystal panel 60 wide and the background easily viewable.

The present invention is applied to an image display device capable of performing transparent display in which a background is viewable from the front-surface side of the display, and is particularly suitable for a display window.

DESCRIPTION OF REFERENCE CHARACTERS

100 to 300: LIQUID CRYSTAL DISPLAY DEVICE (IMAGE DISPLAY DEVICE)
10: CASING
20: CONTROL CIRCUIT
21: SUBFIELD GENERATING CIRCUIT
22: REGISTER
23: DISPLAY CONTROL CIRCUIT (DISPLAY PANEL DRIVE PORTION)
24: BACKLIGHT CONTROL CIRCUIT (LIGHT SOURCE DRIVE PORTION)
30: PANEL DRIVE CIRCUIT (DISPLAY PANEL DRIVE PORTION)
40: BACKLIGHT DRIVE CIRCUIT (LIGHT SOURCE DRIVE PORTION)
50: BACKLIGHT LIGHT SOURCE PORTION (LIGHT SOURCE PORTION)
50*r*: RED LED
50*g*: GREEN LED
50*b*: BLUE LED
55: LED BAR
60: LIQUID CRYSTAL PANEL (DISPLAY PANEL)
61: ABSORPTION TYPE POLARIZING PLATE
62: ABSORPTION TYPE POLARIZING PLATE
63: REFLECTION TYPE POLARIZING PLATE
65: PIXEL FORMATION PORTION
70: LIGHT-GUIDING PLATE

The invention claimed is:

1. An image display device that divides one frame period of a given input image signal into a plurality of subfields and displays a screen of a different color in each of the subfields, to display a color image, the image display device comprising:
    a display panel configured to control a transmittance of incident light;
    a transparent-display-area extraction portion configured to extract an area to be transparently displayed from the input image signal as a transparent display area;
    a subfield generation portion configured to divide the input image signal into the plurality of subfields to generate subfield image signals, and obtain transparency setting data for forcibly transparently displaying the transparent display area in all of the subfields;
    a display panel drive portion configured to display an image on the display panel in each of the subfields based on the subfield image signal, and transparently display the transparent display area on the display panel based on the transparency setting data;
    a light source portion configured to emit light of a different color toward the display panel in each of the subfields;
    a light source drive portion configured to drive the light source portion based on a control signal provided from the subfield generation portion;
    a register connected to the subfield generation portion and configured to store the transparency setting data,
    wherein, when the subfield generation portion is provided with transparent display data indicating the transparent display area extracted by the transparent-display-area extraction portion, the subfield generation portion reads the transparency setting data from the register and provides the transparent display data and the transparency setting data to the display panel drive portion.

2. The image display device according to claim 1, wherein the transparency setting data includes a gradation value that enables transparent display of the transparent display area, and data required for setting a display color of the transparent display area, and
    the display panel drive portion controls at least the gradation value and the display color of the transparent display area displayed on the screen based on the transparency setting data in each of the subfields.

3. The image display device according to claim 2, wherein the gradation value included in the transparency setting data is the same as a gradation value representing highest brightness of the display panel.

4. The image display device according to claim 3, wherein the gradation values included in the transparency setting data include a plurality of gradation values each representing different brightness of the display panel.

5. The image display device according to claim 2, wherein the gradation value included in the transparency setting data is a gradation value representing brightness lower than the highest brightness of the display panel.

6. The image display device according to claim 1, further comprising
a casing configured to accommodate the display panel and the light source portion,
wherein the display panel is attached to an opening formed in the casing, and
the light source portion is attached to an inner surface of the casing, and configured to apply light from a rear-surface side of the display panel.

7. The image display device according to claim 1, wherein
the display panel includes two absorption type polarizing plates respectively adhered to both surfaces of the display panel,
the light source portion includes a light-guiding plate and a light source having a plurality of light emitting elements linearly arranged, the light source being attached to an end of the light-guiding plate such that light emitted from each of the plurality of light emitting elements is incident on the light-guiding plate,
the light-guiding plate and the display panel are fixed, with a background in a viewable state, and
the light source portion emits, toward the display panel, the light incident on the light-guiding plate from the light source.

8. The image display device according to claim 7, wherein both of the two absorption type polarizing plates absorb one of first polarization waves and second polarization waves having different polarization directions, and transmit the other of the first polarization waves and the second polarization waves.

9. The image display device according to claim 7, wherein a reflection structure is formed on at least one of surfaces of the light-guiding plate, the structure being configured to reflect light from the light source and emit the reflected light to outside.

10. The image display device according to claim 1, wherein
the display panel includes an absorption type polarizing plate adhered to a front-surface-side surface of the image display device,
the light source portion includes a light-guiding plate formed by having a reflection type polarizing plate adhered to a back-surface-side surface of the image display device, and a light source having a plurality of light emitting elements linearly arranged, the light source being attached to an end of the light-guiding plate such that light emitted from each of the plurality of light emitting elements is incident on the light-guiding plate,
the light-guiding plate and the display panel are fixed, with a background in a viewable state, and
the light source portion is configured to emit, toward the display panel, the light incident on the light-guiding plate from the light source.

11. The image display device according to claim 10, wherein
the absorption type polarizing plate is a polarizing plate configured to transmit one of the first polarization waves and the second polarization waves and absorb the other of the first polarization waves and the second polarization waves, and
the reflection type polarizing plate is a polarizing plate configured to reflect the same polarization waves as the polarization waves that are absorbed into the absorption type polarizing plate, and transmit the same polarization waves as the polarization waves that are transmitted through the absorption type polarizing plate.

12. The image display device according to claim 10, wherein a reflection structure is formed on at least one of surfaces of the light-guiding plate, the structure being configured to reflect light from the light source and emit the reflected light to outside.

* * * * *